US008656701B2

(12) United States Patent
Akihisa et al.

(10) Patent No.: US 8,656,701 B2
(45) Date of Patent: Feb. 25, 2014

(54) CONTROL DEVICE

(75) Inventors: Daisuke Akihisa, Susono (JP); Koichi Kimura, Numazu (JP); Fumito Chiba, Toyota (JP); Rentaro Kuroki, Susono (JP); Yukihiro Nakasaka, Sunto-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 663 days.

(21) Appl. No.: 12/741,257

(22) PCT Filed: Nov. 6, 2008

(86) PCT No.: PCT/JP2008/070635
§ 371 (c)(1),
(2), (4) Date: Sep. 9, 2010

(87) PCT Pub. No.: WO2009/060997
PCT Pub. Date: May 14, 2009

(65) Prior Publication Data
US 2011/0005207 A1 Jan. 13, 2011

(30) Foreign Application Priority Data
Nov. 7, 2007 (JP) ................. 2007-289124
Apr. 28, 2008 (JP) ................. 2008-116589

(51) Int. Cl.
*F01N 3/00* (2006.01)
(52) U.S. Cl.
USPC ............... 60/277; 60/285; 60/286; 123/435; 123/676; 701/102; 701/103

(58) Field of Classification Search
USPC ............... 60/274–324; 123/78 C, 435, 676; 701/102, 103, 111
See application file for complete search history.

(56) References Cited

U.S. PATENT DOCUMENTS

| 5,220,788 | A | 6/1993 | Kurita et al. |
| 5,752,382 | A * | 5/1998 | Hanafusa et al. ............. 60/277 |
| 7,043,349 | B2 * | 5/2006 | Cullen .......................... 701/103 |
| 7,275,363 | B2 * | 10/2007 | Miura et al. ................... 60/277 |
| 2002/0139346 | A1 | 10/2002 | Aoyama et al. |
| 2003/0084875 | A1 | 5/2003 | Cullen |
| 2004/0000135 | A1 * | 1/2004 | Uchida .......................... 60/277 |
| 2006/0129304 | A1 | 6/2006 | Takemura et al. |

(Continued)

FOREIGN PATENT DOCUMENTS

DE 10 2004 009 999 A1 10/2004
EP 0 475 177 A2 3/1992

(Continued)

OTHER PUBLICATIONS

Aug. 28, 2012 Japanese Office Action issued in Japanese Application No. 2009-540117 (with partial translation).

(Continued)

*Primary Examiner* — Jesse Bogue
(74) *Attorney, Agent, or Firm* — Oliff PLC

(57) ABSTRACT

A control device applied to a system having an engine configured such that an expansion ratio can be changed is characterized to comprise an expansion ratio acquisition part for acquiring the expansion ratio, and a temperature estimation part for estimating a temperature of an exhaust gas discharged from the engine or a member positioned in a passage for the exhaust gas.

12 Claims, 13 Drawing Sheets

(56) References Cited

U.S. PATENT DOCUMENTS

| | | | |
|---|---|---|---|
| 2007/0220868 A1* | 9/2007 | Nishizawa et al. | ............. 60/295 |
| 2007/0227124 A1 | 10/2007 | Fujiki et al. | |
| 2007/0277504 A1 | 12/2007 | Ishikawa et al. | |

FOREIGN PATENT DOCUMENTS

| | | | | |
|---|---|---|---|---|
| EP | 1 247 971 A2 | 10/2002 | | |
| EP | 1 672 346 A2 | 6/2006 | | |
| JP | 02163429 A | * | 6/1990 | ............. F02D 15/04 |
| JP | A-5-010182 | 1/1993 | | |
| JP | A-5-133264 | 5/1993 | | |
| JP | A-2000-213406 | 8/2000 | | |
| JP | A-2000-227364 | 8/2000 | | |
| JP | A-2002-285898 | 10/2002 | | |
| JP | A-2003-148230 | 5/2003 | | |
| JP | A-2003-206771 | 7/2003 | | |
| JP | A-2003-254135 | 9/2003 | | |
| JP | A-2004-028029 | 1/2004 | | |
| JP | A-2004-28029 | 1/2004 | | |
| JP | 2004-156541 | 6/2004 | | |
| JP | A-2004-169660 | 6/2004 | | |
| JP | A-2004-197716 | 7/2004 | | |
| JP | A-2004-225684 | 8/2004 | | |
| JP | A-2004-263626 | 9/2004 | | |
| JP | A-2004-278415 | 10/2004 | | |
| JP | A-2005-069204 | 3/2005 | | |
| JP | A-2005-69218 | 3/2005 | | |
| JP | A-2006-037841 | 2/2006 | | |
| JP | A-2006-046194 | 2/2006 | | |
| JP | A-2006-161583 | 6/2006 | | |
| JP | A-2006-169996 | 6/2006 | | |
| JP | A-2006-183511 | 7/2006 | | |
| JP | A-2006-291742 | 10/2006 | | |
| JP | A-2006-291828 | 10/2006 | | |
| JP | A-2007-16712 | 1/2007 | | |
| JP | A-2007-056837 | 3/2007 | | |
| JP | A-2007-64089 | 3/2007 | | |
| JP | A-2007-64153 | 3/2007 | | |
| JP | A-2007-224927 | 9/2007 | | |
| JP | A-2007-231820 | 9/2007 | | |
| JP | A-2007-262945 | 10/2007 | | |
| JP | A-2007-303423 | 11/2007 | | |
| JP | A-2007-327351 | 12/2007 | | |
| JP | A-2008-19799 | 1/2008 | | |
| JP | A-2008-133802 | 6/2008 | | |
| JP | A-2008-152318 | 7/2008 | | |
| JP | A-2008-157128 | 7/2008 | | |

OTHER PUBLICATIONS

Feb. 10, 2009 International Search Report issued in International Application No. PCT/JP2008/072459, with translation.
Feb. 10, 2009 International Preliminary Report on Patentability issued in International Application No. PCT/JP2008/072459.
U.S. Appl. No. 13/132,451 in the name of Kimura, et al., filed Aug. 1, 2011.
International Search Report dated Feb. 3, 2009 in International Application No. PCT/JP2008/070635 (with translation).
International Preliminary Report on Patentability dated Feb. 3, 2009 in International Application No. PCT/JP2008/070635.

* cited by examiner (i)
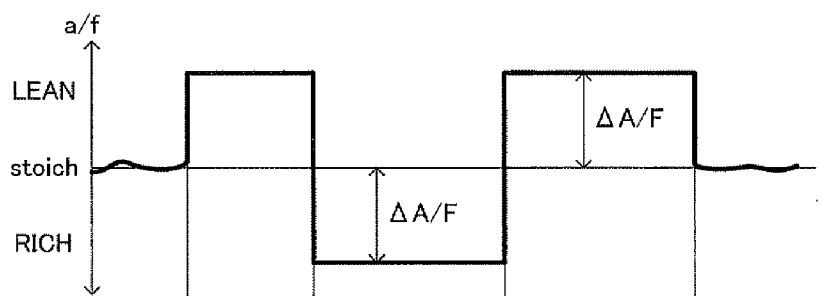
(ii)
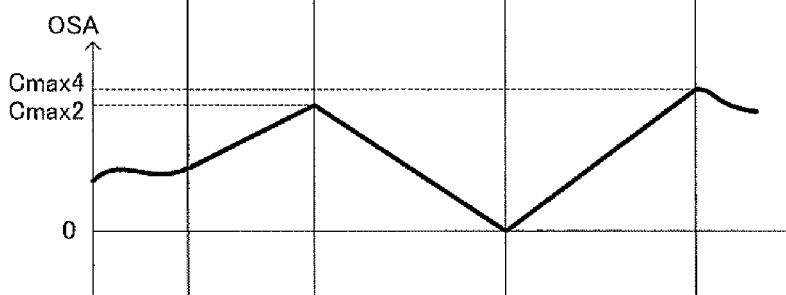
(iii)
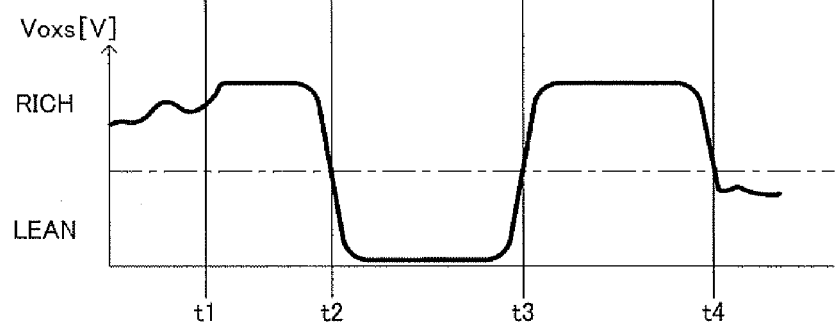
Fig.6

CONTROL DEVICE

TECHNICAL FIELD

The present invention relates to a control device which is applied to a system having an engine configured such that a compression ratio or expansion ratio can be changed.

BACKGROUND ART

In a system using an engine (e.g. an automobile or the like), a state determination, i.e. a diagnosis, of an exhaust system (an exhaust gas sensor or an exhaust gas purification catalyst or the like) is performed by an engine electronic control unit (hereinafter, referred to as "ECU"). This on-board diagnosis (OBD) of the exhaust system includes a catalyst temperature estimation, a catalyst malfunction diagnosis, an exhaust gas sensor malfunction diagnosis, which are explained below, etc.

(1) For example, in this kind of the system, a catalyst is positioned in an exhaust passage in order to purify an exhaust gas. Generally, the catalyst has a property that a purification ratio is high only within a prescribed temperature range (e.g. 400-800° C.). Accordingly, various proposals are conventionally made to increase the catalyst temperature rapidly after an engine is started (for example, Unexamined Japanese Patent Publication No. 2007-231820, etc.).

Further, this kind of the catalyst is deteriorated by deleterious components (lead and sulfur, etc.) in fuel and heat. When the catalyst is deteriorated, an exhaust gas purification ratio is decreased and an exhaust emission is increased. Accordingly, various kinds of devices for determining the deterioration of the catalyst are conventionally proposed (for example, Unexamined Japanese Patent Publication Nos. 5-133264 and 2004-28029, etc.).

Meanwhile, so-called three-way catalyst is widely used as this kind of the catalyst. The three-way catalyst has a function called as an oxygen adsorption function or an oxygen storage function. The function is one which reduces NOx (nitrogen oxide) in the exhaust gas and adsorbs (stores) oxygen removed from the NOx therein when an air-fuel ratio of air-fuel mixture is lean, while discharging the adsorbed oxygen for oxidizing unburned components such as HC and CO, etc. in the exhaust gas when an air-fuel ratio of air-fuel mixture is rich. Accordingly, as a maximum value (hereinafter, referred to as "maximum oxygen storage amount") of an amount (hereinafter, referred to as "oxygen storage amount") of the oxygen which can be stored by the three-way catalyst is large, a purification ability of the three-way catalyst is high. In other words, a deterioration state of the three-way catalyst can be determined by the maximum oxygen storage amount.

In a catalyst deterioration detection device disclosed in the Unexamined Japanese Patent Publication No. 5-133264, a first air-fuel ratio sensor is positioned upstream of the three-way catalyst positioned in the exhaust passage. Further, a second air-fuel ratio sensor is positioned downstream of the three-way catalyst positioned in the exhaust passage. In this configuration, a deterioration determination of the three-way catalyst (a calculation of the maximum oxygen storage amount) is performed as follows. First, an air-fuel ratio of an air-fuel mixture supplied into a cylinder of an engine is set to a predetermined lean air-fuel ratio for a predetermined time period. Thereby, the oxygen is stored in the three-way catalyst to an upper limit of the adsorption ability thereof. Thereafter, the air-fuel ratio of the air-fuel mixture is forcibly changed to a predetermined rich air-fuel ratio. Then, the air-fuel ratio detected by the second air-fuel ratio sensor is maintained to a stoichiometric air-fuel ratio for a constant time period $\Delta t$, and thereafter is changed to a rich air-fuel ratio. On the basis of the difference $\Delta(A/F)$ between the stoichiometric air-fuel ratio and the rich air-fuel ratio, $\Delta t$, and an intake air amount, the maximum oxygen storage amount is calculated.

However, the maximum oxygen storage amount changes depending on a temperature of the three-way catalyst. Specifically, when the temperature of the three-way catalyst increases, the maximum oxygen storage amount increases. Therefore, the catalyst deterioration determination which is performed on the basis of the maximum oxygen storage amount calculated without considering the catalyst temperature has a problem that the determination accuracy is not adequate. Accordingly, a catalyst deterioration detection device disclosed in the Unexamined Japanese Patent Publication No. 2004-28029 is configured to correct the maximum oxygen storage amount based on the catalyst temperature at the period of calculating the maximum oxygen storage amount.

As explained above, the catalyst temperature is an important parameter for the on-board diagnosis of the warm-up state and the deterioration state, etc. of the catalyst. The catalyst temperature can be measured by a catalyst bed temperature sensor (for example, see the Unexamined Japanese Patent Publication No. 2005-69218, etc.). Alternatively, the catalyst temperature can be estimated on board by using other engine parameters such as intake air flow rate, etc. (for example, see the Unexamined Japanese Patent Publication Nos. 2004-28029 and 2004-197716, etc.). In terms of responsiveness, accuracy, cost, etc., it is preferred that the catalyst temperature is estimated on board, rather than measured by a sensor.

(2) For example, in order to control an air-fuel ratio of an engine, a so-called air-fuel ratio feedback control is normally performed. The control is performed on the basis of an output of an exhaust gas sensor (an air-fuel ratio sensor) positioned in an exhaust passage. The exhaust gas sensor is generally an oxygen sensor for generating an output corresponding to an oxygen concentration in an exhaust gas. The exhaust gas sensor(s) is/are provided upstream and/or downstream of a catalyst for purifying the exhaust gas in the flowing direction of the exhaust gas.

The exhaust gas sensor provided downstream of the catalyst is normally comprises a solid-electrolyte type oxygen sensor which has an output property that an output is generally constant under a rich air-fuel ratio relative to the stoichiometric air-fuel ratio and under a lean air-fuel ratio relative to the stoichiometric air-fuel ratio and rapidly changes around the stoichiometric air-fuel ratio. The exhaust gas sensor provided upstream of the catalyst is normally comprises the above-mentioned solid-electrolyte type oxygen sensor or a limiting-current type oxygen concentration sensor which has a relatively linear output property within wide range of the air-fuel ratio.

When a malfunction occurs in the above-mentioned exhaust gas sensor, an air-fuel ratio control of the engine may not be appropriately performed. Accordingly, a device for performing a malfunction diagnosis of the exhaust gas sensor is conventionally proposed (for example, see the Unexamined Japanese Patent Publication Nos. 2003-254135, 2004-225684, 2007-16712, etc.).

This kind of the device is configured to determine if the exhaust gas sensor is normal on the basis of the response state of the exhaust gas sensor to the air-fuel ratio change of air-fuel mixture. For example, in a device disclosed in the Unexamined Japanese Patent Publication No. 2004-225684, the air-fuel ratio is forced to be alternatively changed between predetermined rich and lean air-fuel ratios, and it is determined if there is a sensor malfunction on the basis that whether a sensor output correctly follows the air-fuel ratio change.

DISCLOSURE OF THE INVENTION

An engine configured such that a compression ratio or expansion ratio can be varied, is known (for example, see the Unexamined Japanese Patent Publication Nos. 2003-206771, 2004-156541, 2004-169660, 2007-303423, 2008-19799, 2008-157128, etc.). It should be noted that the "compression ratio" used herein includes "mechanical compression ratio" and "actual compression ratio".

The mechanical compression ratio is a value obtained by dividing the sum of a clearance volume (a combustion chamber volume at a piston top dead center) and a piston displacement volume by the clearance volume, and is referred to as nominal compression ratio or geometric compression ratio. For example, the mechanical compression ratio can be changed by relatively moving a crank case on which a crank shaft is rotatably supported and a cylinder block on which upper end portion a cylinder head is secured, along a central axis of the cylinder. Alternatively, in the case that a connection rod (a member for connecting a piston and the above-mentioned crank shaft to each other) is configured to be folded, the mechanical compression ratio can be changed by changing the folded state of the connection rod.

The actual compression ratio is an effective compression ratio relative to an intake air, and is typically a value obtained by dividing a combustion chamber volume at the beginning of the compression of the intake air by the combustion chamber volume at the end of the compression. The actual compression ratio can be changed along with the above-explained change of the mechanical compression ratio. Further, the actual compression ratio can be changed by changing the mechanical compression ratio and operation timing of an intake valve and/or an exhaust valve, or by changing the operation timing of the intake valve and/or the exhaust valve in place of changing the mechanical compression ratio.

The expansion ratio is a ratio between the volume at the end of the expansion in the expansion stroke and the volume (=the clearance volume) at the beginning of the expansion in the expansion stroke. When the mechanical compression ratio or the actual compression ratio is changed, the expansion ratio can be changed. That is, the expansion ratio can be changed by changing the mechanical compression ratio and/or the opening and/or closing timing of the exhaust valve. Further, the mechanical compression ratio, the actual compression ratio and the expansion ratio can be independently set and changed by changing the opening and/or closing timing of the intake and/or exhaust valve (for example, see the Unexamined Japanese Patent Publication Nos. 2007-303423, 2008-19799, 2008-157128, etc.).

In this kind of the engine, when the compression ratio or the expansion ratio is changed, the combustion state of the air-fuel mixture and/or the exhaust gas temperature are/is changed. Accordingly, the change of the compression ratio or the expansion ratio exerts the accuracy of the on-board diagnosis of the exhaust system.

The object of the present invention is to improve the accuracy of the on-board diagnosis in a system having an engine wherein a compression ratio or an expansion ratio can be changed.

(A) A control device of a first aspect of the present invention is applied to a system having an engine configured such that a compression ratio or an expansion ratio can be changed. For example, in the system, the engine, a passage for an exhaust gas discharged from the engine, and a member (a catalyst, an exhaust gas sensor, etc.) positioned in the passage may be included.

The feature of the first aspect of the present invention is that the control device comprises: a compression ratio acquisition part or an expansion ratio acquisition part, and a temperature estimation part. It should be noted that the "part" can be referred to as "means" (for example, "compression ratio acquisition means", etc.: hereinafter, the same applies).

The compression ratio acquisition part is configured to acquire the compression ratio (the term "acquisition" includes detection or estimation. hereinafter, the same applies.). The expansion ratio acquisition part is configured to acquire the expansion ratio.

The temperature estimation part is configured to estimate a temperature of the exhaust gas or the member on the basis of the acquired compression ratio or expansion ratio.

Specifically, for example, the temperature estimation part may be configured to estimate the temperature of the catalyst on the basis of the compression ratio acquired by the compression ratio acquisition part. In this case, the temperature estimation part may be configured to estimate the temperature of the catalyst on the basis of, at least, a parameter relating to the intake air amount in the engine, and the compression ratio acquired by the compression ratio acquisition part. As the parameters, for example, an intake air flow rate, a load ratio, a throttle valve opening degree, acceleration operation amount, etc. may be used.

The above-mentioned system may be further comprised of a determination part. The determination part is configured to determine the state of the above-mentioned member based on the result of the estimation of the temperature by the temperature estimation part. For example, the deterioration determination part as the determination part determines the deterioration state of the catalyst on the basis of the catalyst temperature estimated by the temperature estimation part.

In the control device of the present invention having the above-explained configuration, an estimated temperature of the exhaust gas or the above-mentioned member is acquired on the basis of the acquired compression ratio or the acquired expansion ratio. For example, the estimated temperature may be acquired by the acquired compression ratio and a calculated temperature obtained based on the parameter(s) in consideration of a reference predetermined compression ratio (maximum or minimum compression ratio). Alternatively, the estimated temperature may be acquired by correcting the calculated temperature obtained on the basis of the parameter(s) depending on the compression or expansion ratio. Further, an on-board diagnosis of the above-mentioned member may be performed by using the estimated temperature acquired as explained above.

Therefore, according to the present invention, the accuracy of the on-board diagnosis can be improved in the system having an engine that a compression ratio or an expansion ratio can be changed.

The determination part may be configured to determine the state of the above-mentioned member when the compression or expansion ratio is constant or the change thereof is within a predetermined range.

According to the above-explained configuration, the determination of the state of the above-mentioned member is performed when the compression or expansion ratio is constant or the change thereof is within the predetermined range. Thereby, the determination of the state of the above-mentioned member is accurately performed.

Further, the above-mentioned system may be further comprised of a compression ratio control part or an expansion ratio control part. The compression ratio control part is configured to control the compression ratio (depending on an operating condition of the engine). Similarly, the expansion ratio control part is configured to control the expansion ratio (depending on the operating condition of the engine). In this case, the compression ratio control part or the expansion ratio control part may be configured to control the compression or expansion ratio, respectively to a constant ratio upon the determination of the above-mentioned state performed by the determination part.

According to the above-explained configuration, the compression ratio control part controls the compression ratio to a constant compression ratio upon the determination of the state of the above-mentioned member. Similarly, the expansion ratio control part controls the expansion ratio to a constant expansion ratio upon the determination of the state of the above-mentioned member. Further, the determination part determines the state of the above-mentioned member in the condition that the compression or expansion ratio is constant or the change thereof is within the predetermined range.

Specifically, for example, the compression ratio control part variably controls the compression ratio depending on the operating condition of the engine when the deterioration determination of the catalyst is not performed, while forbidding the change of the compression ratio upon the deterioration determination of the catalyst. Upon the deterioration determination of the catalyst, the estimated temperature of the catalyst is acquired on the basis of the compression ratio which is controlled to a constant compression ratio by the compression ratio control part. On the basis of the estimated temperature, the deterioration state of the catalyst is determined by the deterioration determination part.

According to the above-explained configuration, the change of the temperature of the above-mentioned member is restricted as possible during the determination of the state of the member. Therefore, the determination of the state of the member is accurately performed.

For example, the compression ratio control part may be configured to control the compression ratio to a low constant compression ratio in order to increase the temperature of the catalyst upon the determination of the deterioration state of the catalyst by the deterioration determination part when the estimated temperature is lower than a predetermined lower limit temperature for the deterioration determination. Alternatively, the compression ratio control part may be configured to control the compression ratio to a high constant compression ratio in order to decrease the temperature of the catalyst upon the determination of the deterioration state of the catalyst by the deterioration determination part when the estimated temperature is higher than a predetermined upper limit temperature for the deterioration determination.

According to the above-explained configuration, upon the determination of the deterioration state of the catalyst by the deterioration determination part, the temperature of the catalyst may be forced to be set within a range suitable for the deterioration determination. Therefore, according to this configuration, the determination of the deterioration state of the catalyst can be accurately performed.

(B) A control device of a second aspect of the present invention is applied to a system having an engine configured such that a compression ratio or an expansion ratio can be changed. For example, in the system, the engine, a passage for an exhaust gas discharged from the engine, and a member (a catalyst, an exhaust gas sensor, etc.) positioned in the passage may be included.

The exhaust gas sensor is configured to generate an output corresponding to a concentration of a specific component (for example, oxygen concentration) in the exhaust gas (the exhaust gas sensor may be referred to as "air-fuel ratio sensor" since it generates an output corresponding to an air-fuel ratio of an air-fuel mixture). The exhaust gas sensor may be provided upstream and/or downstream of an exhaust gas purification catalyst positioned in the passage in the exhaust gas flowing direction.

The control device comprises a compression ratio control part or an expansion ratio control part. The compression ratio control part is configured to control a compression ratio of the engine (depending on an operating condition of the engine). Similarly, the expansion ratio control part is configured to control an expansion ratio of the engine (depending on the operating condition of the engine).

The feature of the second aspect of the present invention is that the compression or expansion ratio control part controls the compression or expansion ratio to a constant ratio during a diagnosis of a malfunction of the above-mentioned member.

In the control device of the present invention having the above-explained configuration, the compression or expansion ratio is controlled such that it is constant during the diagnosis of the malfunction of the above-mentioned member (for example, during the diagnosis of the malfunction of the exhaust gas sensor based on the output of the exhaust gas sensor). Thereby, the combustion state of the air-fuel mixture is controlled constant as possible during the diagnosis of the malfunction of the above-mentioned member. Therefore, according to the present invention, the diagnosis of the malfunction of the member can be accurately performed.

(C) A control device of a third aspect of the present invention is applied to a system having an engine wherein a compression ratio can be changed.

The control device comprises a compression ratio acquisition part, a determination part, and a determination permission part. The compression ratio acquisition part is configured to acquire the compression ratio. The determination part is configured to determine a state of a member positioned in a passage for an exhaust gas discharged from the engine. The determination permission part is configured to permit the determination part to perform the determination on the basis of the compression ratio acquired by the compression ration acquisition part.

It should be noted that the control device may further comprise a compression ratio control part. The compression ratio control part may be configured to control the compression ratio to a constant ratio upon the determination of the above-mentioned state by the determination part (In this case, the compression ratio acquisition part and/or the expansion ratio acquisition part may be omitted).

According to the above-explained configuration, for example, the determination is performed by the determination part when the compression ratio is constant or the change thereof is within a predetermined range. Thereby, the change of the combustion state of the air-fuel mixture or the change of the exhaust gas temperature may be restricted as possible during the determination of the state of the above-mentioned member. Accordingly, the determination (deterioration determination, etc.) of the state of the above-mentioned member can be accurately performed.

(D) A control device of a fourth aspect of the present invention is applied to a system having an engine wherein an expansion ratio can be changed.

The control device comprises an expansion ratio acquisition part, a determination part, and a determination permission part. The expansion ratio acquisition part is configured to acquire the expansion ratio. The determination part is configured to determine a state of a member positioned in a passage for an exhaust gas discharged from the engine. The determination permission part is configured to permit the determination part to perform determination on the basis of the expansion ratio acquired by the expansion ratio acquisition part.

It should be noted that the control device may further comprise an expansion ratio control part. The expansion ratio control part may be configured to control the expansion ratio to a constant ratio upon the determination of the above-mentioned state by the determination part (In this case, the expansion ratio acquisition part and/or the determination permission part may be omitted).

According to the above-explained configuration, for example, the determination is performed by the determination part when the expansion ratio is constant or the change thereof is within a predetermined range. Thereby, the change of the combustion state of the air-fuel mixture or the change of the exhaust gas temperature can be restricted as possible during the determination of the state of the above-mentioned member. Accordingly, the determination (the deterioration determination, etc.) of the state of the member can be accurately performed.

BRIEF DESCRIPTION OF THE DRAWINGS

FIG. 6 is a graph showing an aspect of the performance of the catalyst OBD shown in FIG. 5.

BEST MODE FOR CARRYING OUT THE INVENTION

Figure 1:
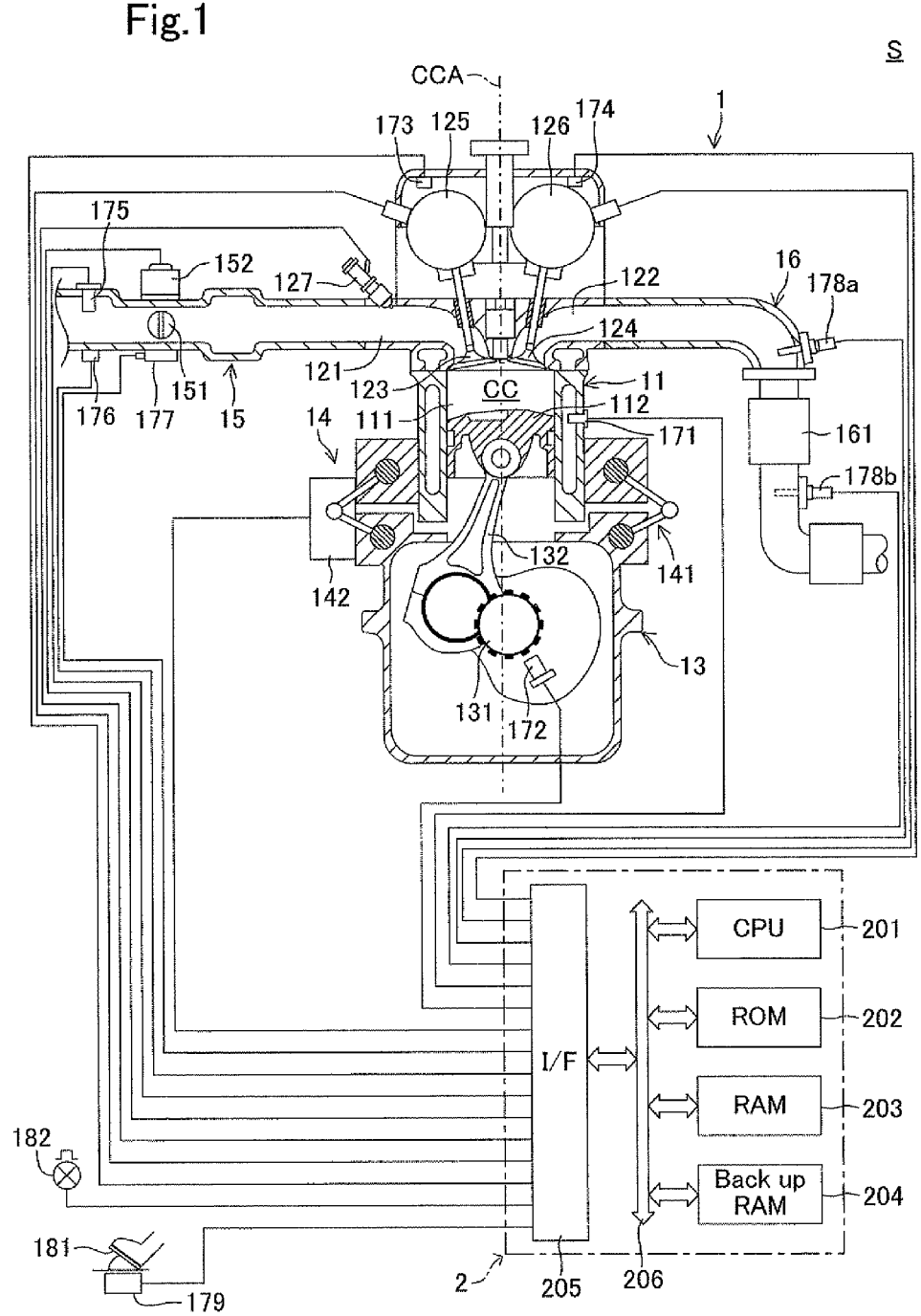
FIG. 1 is a schematic view showing an entire configuration of a system S (a vehicle, etc.) to which the present invention is applied, including an inline multi-cylinder engine and a control device of an embodiment of the present invention.

Below, an embodiment of the present invention (an embodiment which the applicant deems best at the filing of this application) will be explained by referring to the drawings.

It should be noted that the following description relating to the embodiment only concretely describes just an example which embodies the present invention to the extent possible in order to satisfy description requirements (statement requirement, enablement requirements) for the specification required by the law. Accordingly, as explained later, it is quite natural that the present invention is not limited to the illustrative embodiment explained below. Modifications of the embodiment will be explained together at the end of this explanation, since it may lead to a difficulty to understand the self-consistent explanation of the embodiment if explanations of the modifications are inserted into the explanation of the embodiment.

Entire Configuration of System

FIG. 1 is a schematic view showing an entire configuration of a system S (a vehicle, etc) to which the present invention applies, including an inline multi-cylinder engine 1 and a control device of an embodiment of the present invention. It should be noted that a sectional side view of the engine 1 which is cut on a face orthogonal to the cylinder array direction, is shown in FIG. 1.

In this embodiment, the engine 1 is configured such that a mechanical compression ratio can be changed within a predetermined range (for example, between 9 and 26). Further, the engine 1 is configured such that the mechanical compression ratio, an actual compression ratio and an expansion ratio can be set and changed in a substantially independent way by changing the mechanical compression ratio and intake and exhaust valve timings.

The control device 2 of this embodiment is configured to control an operation of the engine 1 and to determine (diagnose) a state of each part of the system S to accordingly indicate the result of the determination (diagnosis) to a driver.

The engine 1 of this embodiment has a cylinder block 11, a cylinder head 12, a crank case 13 and a variable compression ratio mechanism 14. Further, an intake passage 15 and an exhaust passage 16 are connected to the engine 1.

<<Cylinder Block>>

Cylinder bores 111 which are generally cylindrical through holes, are formed in the cylinder block 11. As explained above, a plurality of cylinder bores 111 are arranged in line along the cylinder array direction in the cylinder block 11. A piston 112 is housed inside each cylinder bore 111 such that it can reciprocally move along a central axis (hereinafter, referred to as "cylinder central axis CCA") of the cylinder bore 111.

<<Cylinder Head>>

The cylinder head 12 is connected to an upper end portion of the cylinder block 11 (an end portion of the cylinder block 11 at the top dead center side of the piston 112). The cylinder head 12 is secured to the upper end portion of the cylinder block 11 by bolts not shown, etc. such that the cylinder head does not move relative to the cylinder block 11.

A plurality of recesses are provided on a lower end portion of the cylinder head 12 at positions corresponding to an upper end portion of each cylinder bore 111. That is, in the condition that the cylinder head 12 is connected and secured to the cylinder block 11, combustion chambers CC are formed by spaces inside of the cylinder bores 111 at an upper side (the near side to the cylinder head 12) from the upper faces of the pistons 112 and spaces inside (at lower side) of the above-mentioned recesses. Intake ports 121 and exhaust ports 122 are formed in the cylinder head 12 such that the intake and exhaust ports communicate with the combustion chambers CC.

Further, intake valves 123, exhaust valves 124, a variable intake valve timing device 125, a variable exhaust valve timing device 126 and injectors 127 are provided in the cylinder head 12.

The intake valves 123 are those for controlling states of the communication between the intake ports 121 and the combustion chambers CC. The exhaust valves 124 are those for controlling states of the communication between the exhaust ports 122 and the combustion chambers CC.

The variable intake and exhaust valve timing devices 125 and 126 are configured to be able to change an actual compression ratio and an expansion ratio by changing opening and closing timings of the intake and exhaust valves 123 and 124. Since the illustrative embodiment of the variable intake and exhaust valve timing devices 125 and 126 are well known, the explanations thereof are omitted.

The injectors 127 are configured to be able to inject into the intake ports 121 fuel to be supplied into the combustion chambers CC.

<<Crank Case>>

A crank shaft 131 is positioned parallel to the cylinder array direction and is rotatably supported in the crank case 13. The crank shaft 131 is connected to the pistons 112 via connection rods 132 such that it is rotated by the reciprocal movement of the pistons 112 along the cylinder central axis CCA.

<<Variable Compression Ratio Mechanism>>

The variable compression ratio mechanism 14 of this embodiment is configured to be able to change the mechanical compression ratio within the above-mentioned range by moving the combination of the cylinder block 11 and the cylinder head 12 relative to the crank case 13 along the cylinder central axis CCA to change the clearance volume. The variable compression ratio mechanism 14 has the similar configuration to that described in the Unexamined Japanese Patent Publication Nos. 2003-206771, 2007-056837, etc. Accordingly, in this specification, the detailed explanation of the mechanism is omitted and only the summary thereof will be explained below.

The variable compression ratio mechanism 14 has a connection mechanism 141 and a drive mechanism 142. The connection mechanism 141 is configured to connect the cylinder block 11 and the crank case 13 to each other such that the cylinder block 11 and the crank case 13 can moves relative to each other along the cylinder central axis CCA. The drive mechanism 142 has a servomotor, a gear mechanism, etc., and is configured to be able to move the cylinder block 11 and the crank case 13 relative to each other along the cylinder central axis CCA.

<<Intake and Exhaust Passages>>

An intake passage 15 including an intake manifold, a surge tank, etc. is connected to the intake ports 121. A throttle valve 151 is positioned in the intake passage 15. The throttle valve 151 is configured to be rotated by a throttle valve actuator 152 comprised of a DC motor.

On the other hand, an exhaust passage 16 including an exhaust manifold is connected to the exhaust ports 122. The exhaust passage 16 is one for the exhaust gas discharged from the combustion chambers CC via the exhaust ports 122. A catalytic converter 161 is positioned in the exhaust passage 16. The catalytic converter 161 has a three-way catalyst having an oxygen adsorption function therein and is configured to be able to purify HC, CO and NOx in the exhaust gas.

<<Various Sensors>>

Various sensors such as a cooling water temperature sensor 171, a crank position sensor 172, an intake cam position sensor 173, an exhaust cam position sensor 174, an air flow meter 175, an intake air temperature sensor 176, a throttle position sensor 177, an upstream air-fuel ratio sensor 178a, a downstream air-fuel ratio sensor 178b, an accelerator opening degree sensor 179, etc. are provided in the system S.

The cooling water temperature sensor 171 is mounted on the cylinder block 11. The cooling water temperature sensor 171 is configured to output a signal corresponding to a temperature (a cooling water temperature Tw) of a cooling water in the cylinder block 11.

The crack position sensor 172 is mounted on the crank case 13. The crank position sensor 172 is configured to output a waveform signal having a pulse depending on a rotation angle of the crank shaft 131. Specifically, the crank position sensor 172 is configured to output a signal having a narrow pulse every the crank shaft 131 rotates by 10 degrees and a wide pulse every the crank shaft 131 rotates 360 degrees. That is, the crank position sensor 172 is configured to output a signal corresponding to an engine speed Ne.

The intake and exhaust cam position sensors 173 and 174 are mounted on the cylinder head 12. The intake cam position sensor 173 is configured to output a waveform signal having a pulse depending on a rotation angle of an intake cam shaft not shown (which is included in the variable intake valve timing device 125) for reciprocally moving the intake valves 123. Similarly, the exhaust cam position sensor 174 is configured to output a waveform signal having a pulse depending on a rotation angle of an exhaust cam shaft not shown.

The air flow meter 175, the intake air temperature sensor 176 and the throttle position sensor 177 are mounted on the intake passage 15. The air flow meter 175 is configured to output a signal corresponding to a mass flow rate (an intake air flow rate Ga) of an intake air flowing in the intake passage 15. The intake air temperature sensor 176 is configured to output a signal corresponding to a temperature of the intake air. The throttle position sensor 177 is configured to output a signal corresponding to a rotation phase (a throttle valve opening degree TA) of the throttle valve 151.

The upstream and downstream air-fuel ratio sensors 178a and 178b are mounted on the exhaust passage 16. The upstream air-fuel ratio sensor 178a is positioned upstream of the catalytic converter 161 in a flowing direction of an exhaust gas. The downstream air-fuel ratio sensor 178b is positioned downstream of the catalytic converter 161 in the flowing direction of the exhaust gas.

Figure 2A:
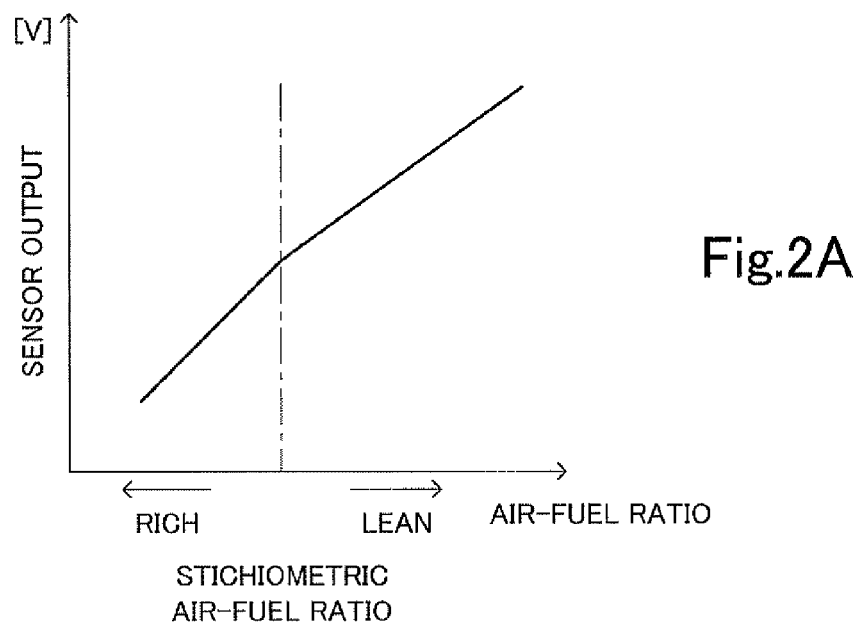
FIG. 2A is a graph showing an output property of an upstream air-fuel ratio sensor shown in FIG. 1.
Figure 2B:
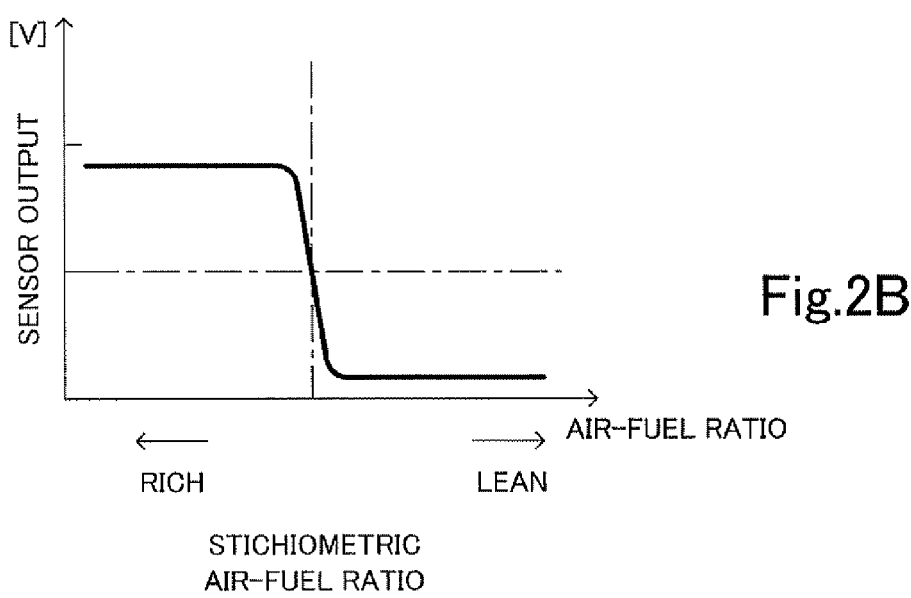
FIG. 2B is a graph showing an output property of a downstream air-fuel ratio sensor shown in FIG. 1.

FIG. 2A is a graph showing an output property of the upstream air-fuel ratio sensor 178a shown in FIG. 1. FIG. 2B is a graph showing an output property of the downstream air-fuel ratio sensor 178b shown in FIG. 1.

As shown in FIG. 2A, the upstream air-fuel ratio sensor 178a is a universal type air-fuel ratio sensor having an output property that an output thereof is relatively linear within a wide range of the air-fuel ratio. Specifically, the upstream air-fuel ratio sensor 178a is comprised of a limiting current type oxygen concentration sensor. As shown in FIG. 2B, the downstream air-fuel ratio sensor 178b is an air-fuel ratio sensor having an output property that an output thereof is generally constant under the rich side and the lean side of the stoichiometric air-fuel ratio while the output rapidly changes around the stoichiometric air-fuel ratio. Specifically, the downstream air-fuel ratio sensor 178b is comprised of a solid electrolyte type zirconia oxygen sensor.

Referring to FIG. 1 again, the accelerator opening degree sensor 179 is configured to output a signal corresponding to an operation amount (an accelerator operation amount Accp) of an acceleration pedal operated by the driver. Further, an alarm device 182 having an alarm indicating light, etc. is provided at a position which the driver can easily see.

<<Control Device>>

The control device 2 has a CPU 201, a ROM 202, a RAM 203, a backup RAM 204, an interface 205 and a bus 206. The CPU 201, the ROM 202, the RAM 203, the backup RAM 204 and the interface 205 are connected to each other by the bus 206.

Routines (programs) to be performed by the CPU 201, tables (lookup tables, maps), parameters, etc. are previously stored in the ROM 202. The RAM 203 is configured to be able to temporarily store data as necessary when the CPU 201 performs the routines. The backup RAM 204 is configured such that data is stored therein when the CPU 201 performs the routines in the condition that a power is applied and the stored data can be retained after the power shutdown.

The interface 205 is electrically connected to various sensors such as the cooling water temperature sensor 171, the crank position sensor 172, the intake cam position sensor 173, the exhaust cam position sensor 174, the air flow meter 175, the intake air temperature sensor 176, the throttle position sensor 177, the upstream air-fuel ratio sensor 178a, the downstream air-fuel ratio sensor 178b, the accelerator opening degree sensor 179, etc., and is configured to be able to transmit the signals from the sensors to the CPU 201.

Further, the interface 205 is electrically connected to operating parts such as the variable intake valve timing device 125, the variable exhaust valve timing device 126, the injectors 127, the drive mechanism 142, the alarm device 182, etc., and is configured to be able to transmit operating signals for operating the operating parts from the CPU 201 to the operating parts.

Furthermore, the interface 205 is configured to transmit an output signal (on the basis thereof, a setting state of the mechanical compression ratio in the engine 1 can be recognized) of an encoder provided in the servomotor provided in the drive mechanism 142 to the CPU 201.

That is, the control device 2 is configured to receive signals from the above-mentioned various sensors via the interface 205 and output the above-mentioned operating signals to each operating part on the basis of the result of the calculation performed by the CPU 201 depending on the received signals.

It should be noted that in this embodiment, a compression ratio control part, an expansion ratio control part, a compression ratio acquisition part and an expansion ratio acquisition part of the present invention are comprised of the drive mechanism 142 for setting a state of movement of the cylinder block 11 and the cylinder head 12 relative to the crank case 13 by the variable compression ratio mechanism 14, the variable intake and exhaust valve timing device 125 and 126 for setting intake and exhaust valve timings, and the control device 2 (the CPU 201) for controlling the states thereof.

Further, in this embodiment, a temperature estimation part and a determination part (a diagnosis determination part) of the present invention are comprised of the control device 2 (the CPU 201) and the above-mentioned various sensors connected to the control device 2 via the interface 205.

Furthermore, in this embodiment, a determination permission part of the present invention is comprised of the control device 2 (the CPU 201).

Summary of Operation

Below, a summary of operation of the system S of this embodiment will be explained.

<<Control of Air-fuel Ratio>>

A target air-fuel ratio is set on the basis of the throttle valve opening degree TA, etc. The target air-fuel ratio is normally set to the stoichiometric air-fuel ratio. On the other hand, in the case of acceleration, etc., the target air-fuel ratio may be set to a ratio slightly shifted to a rich or lean side of the stoichiometric air-fuel ratio as necessary.

Further, when a predetermined sensor OBD condition is satisfied, a malfunction diagnosis (a sensor OBD) of the upstream and/or downstream air-fuel ratio sensor(s) 178a and/or 178b is performed once every one trip (which is a period from the start of the engine 1 to the stop thereof). During the sensor OBD, the target air-fuel ratio is controlled such that it is changed in the rectangular waveform between a ratio shifted to a rich side of the stoichiometric air-fuel ratio and a ratio shifted to a lean side of the stoichiometric air-fuel ratio (a so-called air-fuel ratio active control).

Further, the above-mentioned air-fuel ratio active control is performed when a deterioration diagnosis of the catalytic converter 161 (a catalyst OBD) is performed in a predetermined operating condition during the stationary operation.

A base value of an amount of a fuel injected from the injectors 127 (a base fuel injection amount) is acquired on the basis of the target air-fuel ratio set as explained above, the intake air flow rate Ga, etc.

When a predetermined feedback control condition is not satisfied, such as when the upstream and downstream air-fuel ratio sensors 178a and 178b are not sufficiently warmed immediately after the engine 1 is started, an open-loop control is performed on the basis of the base fuel injection amount. (In this open-loop control, a learning control may be performed on the basis of learning correction coefficient.)

When the feedback control condition is satisfied, an actual amount (a command fuel injection amount) of the fuel injected from the injectors 127 is acquired by performing a feedback correction of the base fuel injection amount on the basis of the outputs of the upstream and downstream air-fuel ratio sensors 178a and 178b. Further, an air-fuel ratio learning for acquiring the learning correction coefficient for the above-mentioned open-loop control is performed on the basis of the outputs of the upstream and downstream air-fuel ratio sensors 178a and 178b.

<<Catalyst OBD>>

The air-fuel ratio of the air-fuel mixture is forced to be changed in the rectangular waveform by the above-mentioned air-fuel ratio active control. First, the air-fuel ratio of the air-fuel mixture is set to a predetermined lean air-fuel ratio for a predetermined period. Thereby, oxygen is stored in the three-way catalyst of the catalytic converter 161 to the upper limit of the adsorption ability. Thereafter, the air-fuel ratio of the air-fuel mixture is forced to be changed to a predetermined rich air-fuel ratio. Then, the air-fuel ratio detected by the downstream air-fuel ratio sensor 178b changes to a rich side after it is maintained to the stoichiometric air-fuel ratio for a constant time $\Delta t$. A maximum oxygen storage amount of the three-way catalyst of the catalytic converter 161 is calculated on the basis of the difference $\Delta(A/F)$ between the stoichiometric air-fuel ratio and the rich air-fuel ratio, $\Delta t$ and the intake air amount at this time. The deterioration diagnosis of the catalytic converter 161 is performed on the basis of the acquired maximum oxygen storage amount.

<<Sensor OBD>>

The air-fuel ratio of the air-fuel mixture is forced to be changed in the rectangular waveform by the above-mentioned air-fuel ratio active control. At this time, it is determined if there is a malfunction of the upstream and/or downstream air-fuel ratio sensor(s) 178a and/or 178b by determining if an output wave correctly following the change of the air-fuel ratio occurs. Since a concrete content of such a sensor OBD is well known, the detailed explanation thereof is omitted in this specification.

<<Control of Compression and Expansion Ratios>>

The mechanical compression ratio, the actual compression ratio and the expansion ratio are controlled on the basis of the operating condition such as the warmed condition, the load condition, etc. of the engine 1.

Specifically, the compression ratio is set to a low compression ratio in order to promptly warm a body of the engine 1 and the catalytic converter 161 during a warming operation. When the operating condition of the engine 1 reaches a regular area (at the running in the urban area, at the running on the highway, etc.) after the engine has been warmed, the compression ratio is set to a high compression ratio. Thereby, a heat efficiency is increased and a fuel consumption is improved. On the other hand, in a large output area (at rapid acceleration, at the running uphill, etc.), the compression ratio is set to a low compression ratio. Thereby, a knocking is restricted while a large output is obtained.

The actual compression ratio is a value determined by an actual stroke volume from when the compression action actually starts until the piston 112 reaches a dead top center, and a clearance volume (a volume of the combustion chamber CC at the dead top center of the piston 112). The clearance volume is determined depending on the setting state of the mechanical compression ratio. On the other hand, even when the piston 112 moves upwardly at the compression stroke, the compression action does not substantially occur during the opening of the intake valve 123, and the actual compression action starts from when the intake valve 123 is closed. Accordingly, when the mechanical compression ratio is constant, the actual compression ratio is decreased by delaying the closing timing of the intake valve 123.

The expansion ratio is a ratio of a volume at the end of the expansion at the expansion stroke to the clearance volume. As explained above, the clearance volume is determined depending on the setting state of the mechanical compression ratio. On the other hand, the expansion ratio is variable depending on the opening timing of the exhaust valve 124. For example, the exhaust gas temperature may be increased by advancing the opening timing of the exhaust valve 124 in order to promptly warm the catalytic converter 161. Further, an engine heat efficiency can be increased by delaying the opening timing of the exhaust valve 124 as possible.

Accordingly, for example, at the engine low load operation, the engine heat efficiency can be increased by setting the expansion ratio to a high ratio (for example, around 26) by setting the mechanical compression ratio to a high ratio and delaying the opening timing of the exhaust valve 124 as possible, while an abnormal combustion such as knocking, etc. can be restricted by setting the actual compression ratio to a low ratio (for example, around 11) by delaying the closing timing of the intake valve 123 (a so-called high expansion ratio cycle).

Specifically, for example, as the engine load decreases, the mechanical compression ratio and the expansion ratio are set to high ratios while the closing timing of the intake valve 123 is delayed. Thereby, the actual compression ratio is set to a generally constant ratio at the engine low load or the engine high load.

In this regard, however, when the mechanical compression ratio and the expansion ratio are changed during the OBD, the accuracy of the OBD may be decreased. Specifically, when the mechanical compression ratio and the expansion ratio are changed during the OBD, the combustion state of the air-fuel mixture and/or the exhaust gas temperature change, and the changes exert the outputs of the upstream and downstream air-fuel ratio sensors 178a and 178b. Also, the change of the exhaust gas temperature leads to a change of the temperature of the catalytic converter 161, and then the oxygen adsorption function (an oxygen adsorption and discharge property) of the catalytic converter 161 changes. In particular, in the OBD of the downstream air-fuel ratio sensor 178b, when the oxygen adsorption function of the catalytic converter 161 is not maintained constant, it is difficult to perform the OBD accurately.

Accordingly, the variable compression ratio mechanism 14, the variable intake valve timing device 125 and the variable exhaust valve timing device 126 are controlled such that the mechanical compression ratio and the expansion ratio are maintained (generally) constant during the OBD. Alternatively, the OBD is permitted to be performed in the condition that the mechanical compression ratio and the expansion ratio are maintained (generally) constant.

Explanation of Operation

Next, a concrete example of the operation of the control device 2 of this embodiment shown in FIG. 1 will be explained by using flowcharts. It should be noted that in the following explanation, "step" is abbreviated as "S" (in the drawings, "step" is also abbreviated as "S").

FIRST CONCRETE EXAMPLE

In a first concrete example as explained below, it is assumed that a control of the mechanical compression ratio and the expansion ratio is performed such that the mechanical compression ratio and the expansion ratio are generally equal to each other. That is, in the first concrete example, it is assumed that the opening timing of the exhaust valve 124 is constant (is set to a maximally delayed timing within a variable range).

Further, it is assumed that the closing timing of the intake valve 123 is appropriately set depending on the operating condition. That is, in this concrete example, it is assumed that the so-called high expansion ratio cycle can be realized (the same applies to the other concrete examples).

<<Determination of Catalyst OBD Condition>>

Figure 3:
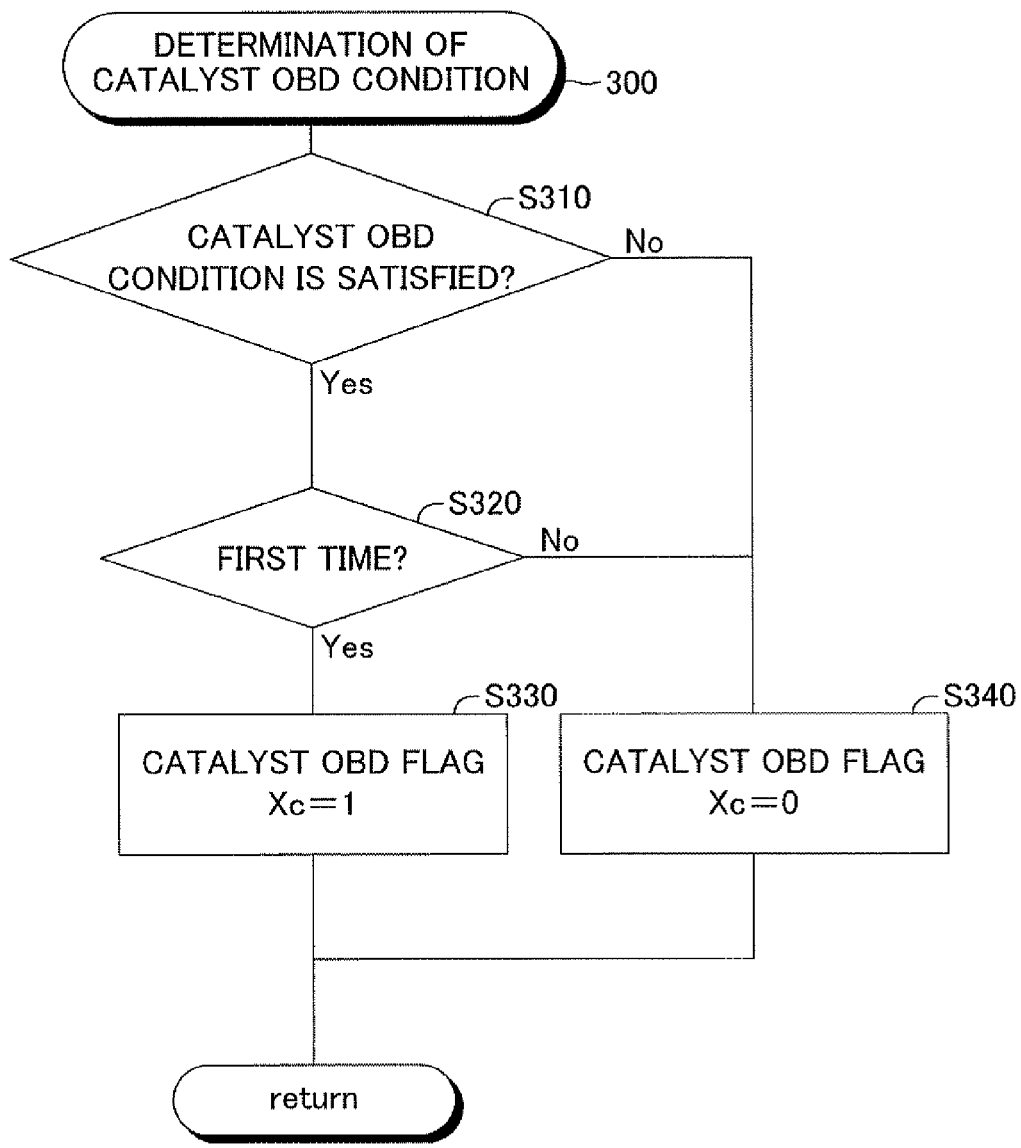
FIG. 3 is a flowchart showing an operation of a catalyst OBD condition determination in a first concrete example of an operation of the control device of the embodiment shown in FIG. 1.

The CPU 201 performs a catalyst. OBD condition determination routine 300 shown in FIG. 3 every a predetermined timing comes.

First, at S310, it is determined if a catalyst OBD condition is satisfied. The catalyst OBD condition is that the engine 1 has been warmed (the cooling water temperature Tw≧Tw0), the amount of the change of the throttle valve opening degree TA per unit time is smaller than or equal to a predetermined amount, the vehicle speed is higher than or equal to a predetermined speed, and the intake air flow rate is lower than or equal to a predetermined flow rate (around an intake air flow rate wherein a so-called "blow-by" does not occur in the catalytic converter 161).

When the catalyst OBD condition is satisfied (S310=Yes), the process proceeds to S320, and it is determined if the satisfaction of the catalyst OBD condition at this time is the first satisfaction after the engine 1 starts. When the satisfaction of the catalyst OBD condition at this time is the first satisfaction after the engine 1 starts (S320=Yes), the process proceeds to S330, and a catalyst OBD flag Xc is set. When the catalyst OBD condition is not satisfied (S310=No) or when the satisfaction of the catalyst OBD condition at this time is not the first satisfaction after the engine 1 starts (S320=No), the process proceeds to S340, and the catalyst OBD flag Xc is reset. Thereafter, this routine is terminated once.

<<Setting of Mechanical Compression Ratio (Expansion Ratio)>>

Figure 4:
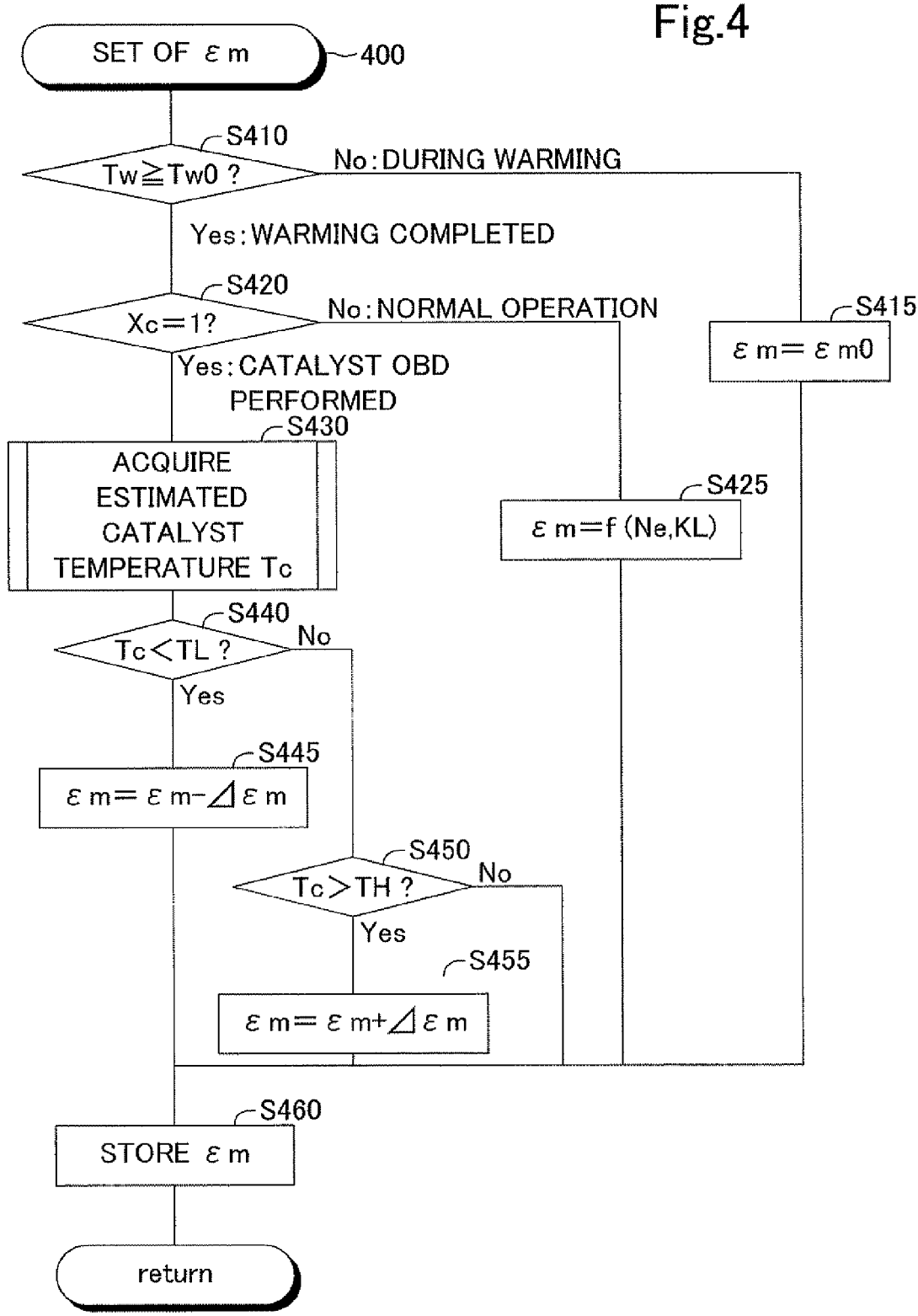
FIG. 4 is a flowchart showing a mechanical compression ratio set/control operation in the first concrete example.

The CPU 201 performs a mechanical compression ratio setting routine 400 shown in FIG. 4 every a predetermined timing comes. It should be noted that in this concrete example, as explained above, the opening timing of the exhaust valve 124 is constant. Accordingly, in this concrete example, a compression ratio control part (a compression ratio control means) and an expansion ratio control part (an expansion ratio control means) of the present invention are realized by the process of this routine 400 in the control device 2 (the CPU 201).

First, at S410, it is determined if the engine 1 has been warmed (the cooling water temperature Tw≥TW0). When the engine 1 is being warmed (S410=No), the process proceeds to S415. At S415, the mechanical compression ratio $\epsilon m$ (i.e. the expansion ratio $\epsilon e$) is set to a low value $\epsilon m0$ (i.e. $\epsilon e0$) to facilitate the warming of the engine 1 and the catalytic converter 161 by increasing the exhaust gas temperature.

When the engine 1 has been warmed (S410=Yes), the process proceeds to S420, and it is determined if the catalyst OBD flag Xc is set. When the catalyst OBD flag Xc is not set (S420=No), the present operating condition is in a normal operating after the engine 1 has been warmed. Accordingly, in this case, the process proceeds to S425. At S425, the mechanical compression ratio $\epsilon m$ is acquired by using a map, etc. on the basis of the engine speed Ne and the load ratio KL. It should be noted that the load ratio KL can be acquired on the basis of the intake air flow rate Ga or the throttle valve opening degree TA or the accelerator operation amount Accp as is well known.

When the engine 1 has been wormed (S410=Yes) and the catalyst OBD flag Xc is set (S420=Yes), a catalyst OBD is performed. In this case, first, the process proceeds to S430, and an estimated temperature of the three-way catalyst (an estimated catalyst temperature Tc) in the catalytic converter 161 is acquired. The acquisition of the estimated catalyst temperature Tc (an on-board estimation of the catalyst temperature) will be explained later in detail. Next, at S440, it is determined if the estimated catalyst temperature Tc is lower than a predetermined lower limit temperature TL. When the estimated catalyst temperature Tc is lower than the lower limit temperature TL (S440=Yes), the process proceeds to S445, and the mechanical compression ratio $\epsilon m$ is set. When the estimated catalyst temperature Tc is higher than or equal to the lower limit temperature TL (S440=No), the process of S445 is skipped, and the process proceeds to S450. At S450, it is determined if the estimated catalyst temperature Tc is higher than a predetermined upper limit temperature TH. When the estimated catalyst temperature Tc is higher than the upper limit temperature TH (S450=Yes), the process proceeds to S455, and the mechanical compression ratio $\epsilon m$ is set. When the estimated catalyst temperature Tc is lower than or equal to the upper limit temperature TH (S450=No), the process of S455 is skipped.

At S445, the mechanical compression ratio is lowered by $\Delta \epsilon m$ from the last time in order to increase the temperature of the catalytic converter 161 to a temperature range (TL-TH) suitable for the catalyst OBD by increasing the exhaust gas temperature. By contrast, at S455, the mechanical compression ratio is raised by $\Delta \epsilon m$ from the last time in order to decrease the temperature of the catalytic converter 161 to a temperature within the above-mentioned temperature range by decreasing the exhaust gas temperature. On the other hand, when the estimated catalyst temperature Tc is within the above-mentioned temperature range (S440=No, S450=No), the processes of S445 and S455 are skipped, and therefore the mechanical compression ratio is set to the same ratio as the last mechanical compression ratio. That is, the mechanical compression ratio $\epsilon m$ is maintained constant.

After the above-explained process for setting the mechanical compression ratio $\epsilon m$ (the expansion ratio $\epsilon e$) is performed, the setting state of the mechanical compression ratio $\epsilon m$ is stored in the backup RAM 204 at S460. Thereafter, this routine is terminated once.

<<Catalyst OBD>>

Figure 5:
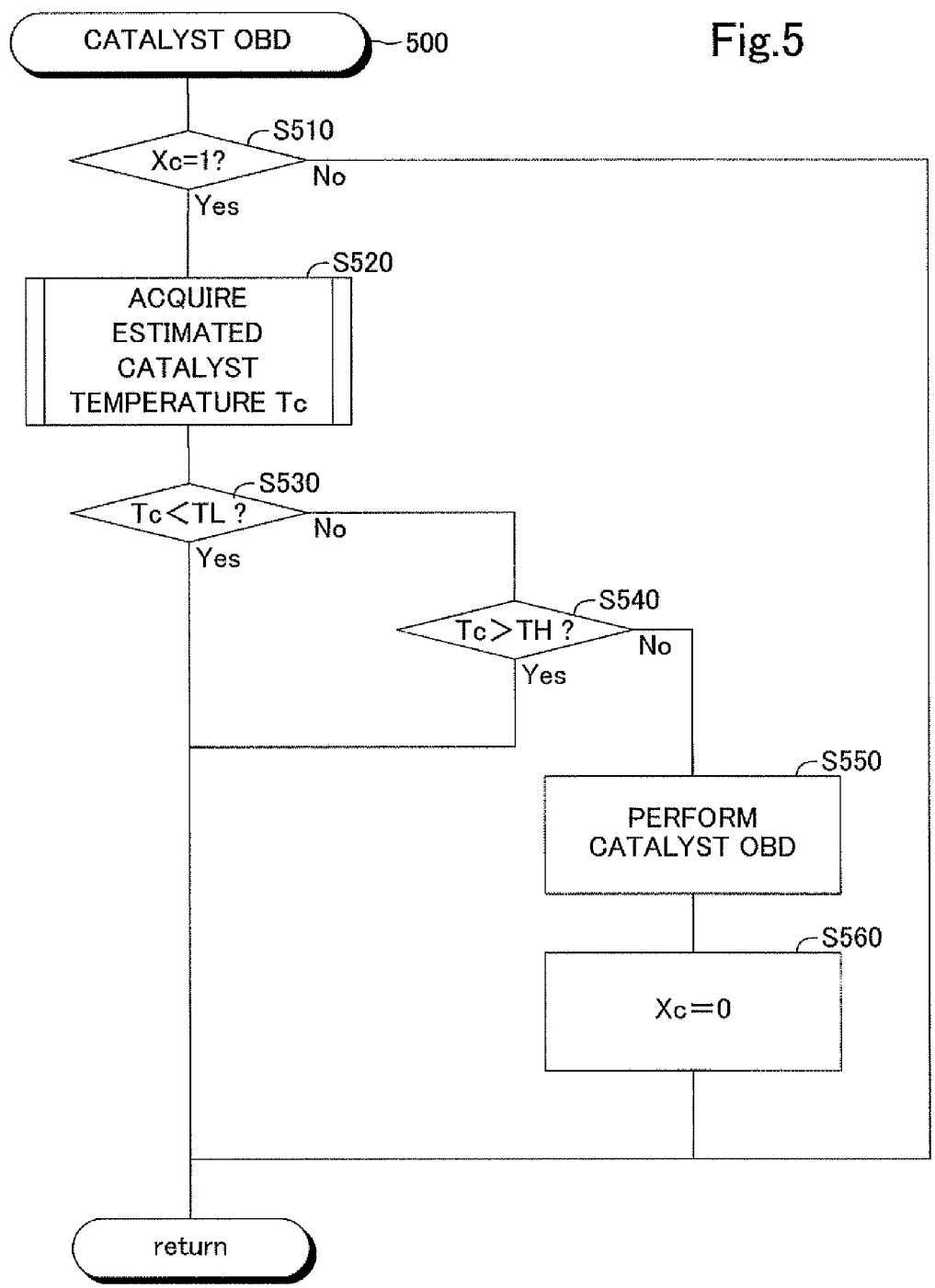
FIG. 5 is a flowchart showing a catalyst OBD operation in the first concrete example.

The CPU 201 performs a catalyst OBD routine 500 shown in FIG. 5 every a predetermined timing comes. It should be noted that in this concrete example, a determination part (determination means) and a deterioration determination part (deterioration determination means) of the present invention are realized by the process of this routine 500 in the control device 2 (the CPU 201).

First, at S510, it is determined if the catalyst OBD flag Xc is set. When the catalyst OBD flag Xc is set (S510=Yes), the process proceeds to S520 and steps following it. When the catalyst OBD flag Xc is not set (S510=No), the processes of S520 and the steps following it are skipped and this routine is terminated once.

At S520, similar to S430, the estimated catalyst temperature Tc is acquired. The acquisition of the estimated catalyst temperature Tc will be explained later in detail. Next, at S530, it is determined if the estimated catalyst temperature Tc is lower than the lower limit temperature TL. When the estimated catalyst temperature Tc is higher than or equal to the lower limit temperature TL (S530=No), the process proceeds to S540, and it is determined if the estimated catalyst temperature Tc is higher than the upper limit temperature TH. When the estimated catalyst temperature Tc is within the above-mentioned temperature range (S530=No, S540=No), the process proceeds to S550 and the catalyst OBD is performed and when it is determined that a deterioration of the catalyst occurs, an alarm is generated to the driver by the alarm device 182. After the catalyst OBD is performed, the catalyst OBD flag is reset at S560.

When the estimated catalyst temperature Tc is not within the above-mentioned temperature range (S530=Yes or S540=Yes), this routine is terminated once. That is, the performance of the catalyst OBD is held until the estimated catalyst temperature Tc reaches the above-mentioned temperature range.

FIG. 6 is a graph showing an aspect when the catalyst OBD is performed. In FIG. 6, (i) is a graph showing a change of the air-fuel ratio during the catalyst OBD, (ii) is a graph showing an oxygen storage amount OSA of the catalytic converter 161 which changes corresponding to the change of the air-fuel ratio shown in (i), (iii) is a graph showing an output Voxs of the downstream air-fuel ratio sensor 178b corresponding to the change of the air-fuel ratio shown in (i) and the change of the oxygen storage amount OSA shown in (ii).

First, as shown in (i) of FIG. 6, the air-fuel ratio is set to an air-fuel ratio leaner than the stoichiometric air-fuel ratio (stoich) by $\Delta A/F$ from the catalyst OBD starting time t1. Then, an exhaust gas having a lean air-fuel ratio flows into the catalytic converter 161. Accordingly, as shown in (ii) of FIG. 6, the oxygen storage amount OSA of the catalytic converter 161 progressively increases and reaches a peak value Cmax2 at the time t2.

When the oxygen storage amount OSA of the catalytic converter 161 reaches the peak value Cmax2, no oxygen can be adsorbed by the catalytic converter 161 any more. Accordingly, from the time t2, the exhaust gas including oxygen (the exhaust gas having a lean air-fuel ratio) starts to flow out to the downstream side of the catalytic converter 161. Therefore, as shown (iii) of FIG. 6, the output Voxs of the downstream air-fuel ratio sensor 178*b* changes to a value largely shifted to the lean side of the stoichiometric air-fuel ratio.

When it is determined that the output Voxs of the downstream air-fuel ratio sensor 178*b* changes to the value largely shifted to the lean side of the stoichiometric air-fuel ratio at the time t2, the air-fuel ratio is set to an air-fuel ratio richer than the stoichiometric air-fuel ratio by $\Delta A/F$ as shown in (i) of FIG. 6. Then, the exhaust gas having a rich air-fuel ratio flows into the catalytic converter 161. At this time, the oxygen stored in the catalytic converter 161 is consumed for an oxidization of inflow unburned HC and CO. Accordingly, as shown in (ii) of FIG. 6, the oxygen storage amount OSA of the catalytic converter 161 progressively decreases from Cmax2, and the oxygen storage amount of the catalytic converter 161 becomes "zero" at the time t3.

When the oxygen storage amount OSA of the catalytic converter 161 becomes zero, no unburned HC nor CO can be oxidized by the catalytic converter 161 any more. Accordingly, from the time 3, the gas having a rich air-fuel ratio starts to flow out to the downstream side of the catalytic converter 161. Therefore, as shown in (iii) of FIG. 6, the output Voxs of the downstream air-fuel ratio sensor 178*b* changes from a value indicating a lean air-fuel ratio to a value indicating a rich air-fuel ratio.

When it is determined that the output of the downstream air-fuel ratio sensor 178*b* changes from the value indicating the lean air-fuel ratio to the value indicating the rich air-fuel ratio at the time t3, the air-fuel ratio is again set to an air-fuel ratio leaner than the stoichiometric air-fuel ratio by $\Delta A/F$ as shown in (i) of FIG. 6. Thereby, as shown in (ii) of FIG. 6, the oxygen storage amount OSA of the catalytic converter 161 continues to increase from "zero" and reaches a peak value Cmax4 at the time t4. Then, similar to the above explanation, at the time 4, the output Voxs of the downstream air-fuel ratio sensor 178*b* changes from a value indicating a rich air-fuel ratio to a value indicating a lean air-fuel ratio. When it is determined that the output Voxs of the downstream air-fuel ratio sensor 178*b* changes as explained above at the time t4, the catalyst OBD is terminated and the air-fuel ratio control is returned to the normal control.

By performing the rectangular waveform air-fuel ratio control (the active control) as explained above, the maximum oxygen storage amount Cmax of the catalytic converter 161 is acquired according to the following expressions. It should be noted that in the following expressions, the value "0.23" is a fraction of the oxygen included in the atmosphere by weight, and mfr is a total amount of the fuel injection amounts Fi within a predetermined period (a calculation cycle tsample).

$\Delta O2 = 0.23 \cdot mfr \cdot \Delta A/F$ $Cmax2 = \Sigma \Delta O2 (\text{zone } t = t2 - t3)$ $Cmax4 = \Sigma \Delta O2 (\text{zone } t = t3 - t4)$ $Cmax = (Cmax2 + Cmax4)/2$ As shown in the expressions, an amount of the shortage of the air in the predetermined period tsample is calculated by multiplying the total amount mfr of the fuel injection amounts in the predetermined period tsample in the zone t=t2−t3 by the deviation $\Delta A/F$ of the air-fuel ratio A/F compared with the stoichiometric air-fuel ratio, and the amount $\Delta O2$ of the change of the oxygen storage amount (the amount of the consumption of the adsorbed oxygen) in the predetermined period tsample is calculated by multiplying the amount of the shortage of the air by the fraction of the oxygen by weight. Then, the oxygen consumption amount until the condition of the catalytic converter 161 changes from the condition that it maximally stores oxygen therein to the condition that it maximally consumes the oxygen, i.e. the peak value Cmax2, is estimated and calculated by integrating the amount $\Delta O2$ of the change of the oxygen storage amount from the time t2 to the time t3. Similarly, in the zone t=t3−t4, the oxygen storage amount until the condition of the catalytic converter 161 changes from the condition that it maximally consumes the oxygen to the condition that it maximally stores oxygen therein, i.e. the peak value Cmax4, is estimated and calculated by integrating the amount $\Delta O2$ of the change of the oxygen storage amount.

It should be noted that the above expressions can be simplified as follows when the cylinder intake air amount Mc is constant (i.e. the intake air flow rate Ga is constant) during the catalyst OBD.

$Cmax2 = 0.23 \cdot mfr \cdot \Delta A/F \cdot (t3 - t2)$ $Cmax4 = 0.23 \cdot mfr \cdot \Delta A/F \cdot (t4 - t3)$ $Cmax = (Cmax2 + Cmax4)/2$ It should be noted that in this concrete example, a determination permission part (determination permission means) of the present invention is realized by the processes of S440-S455 and S530-S540 in the control device 2 (the CPU 201).

<<Acquisition of Estimated Catalyst Temperature>>

Figure 7:
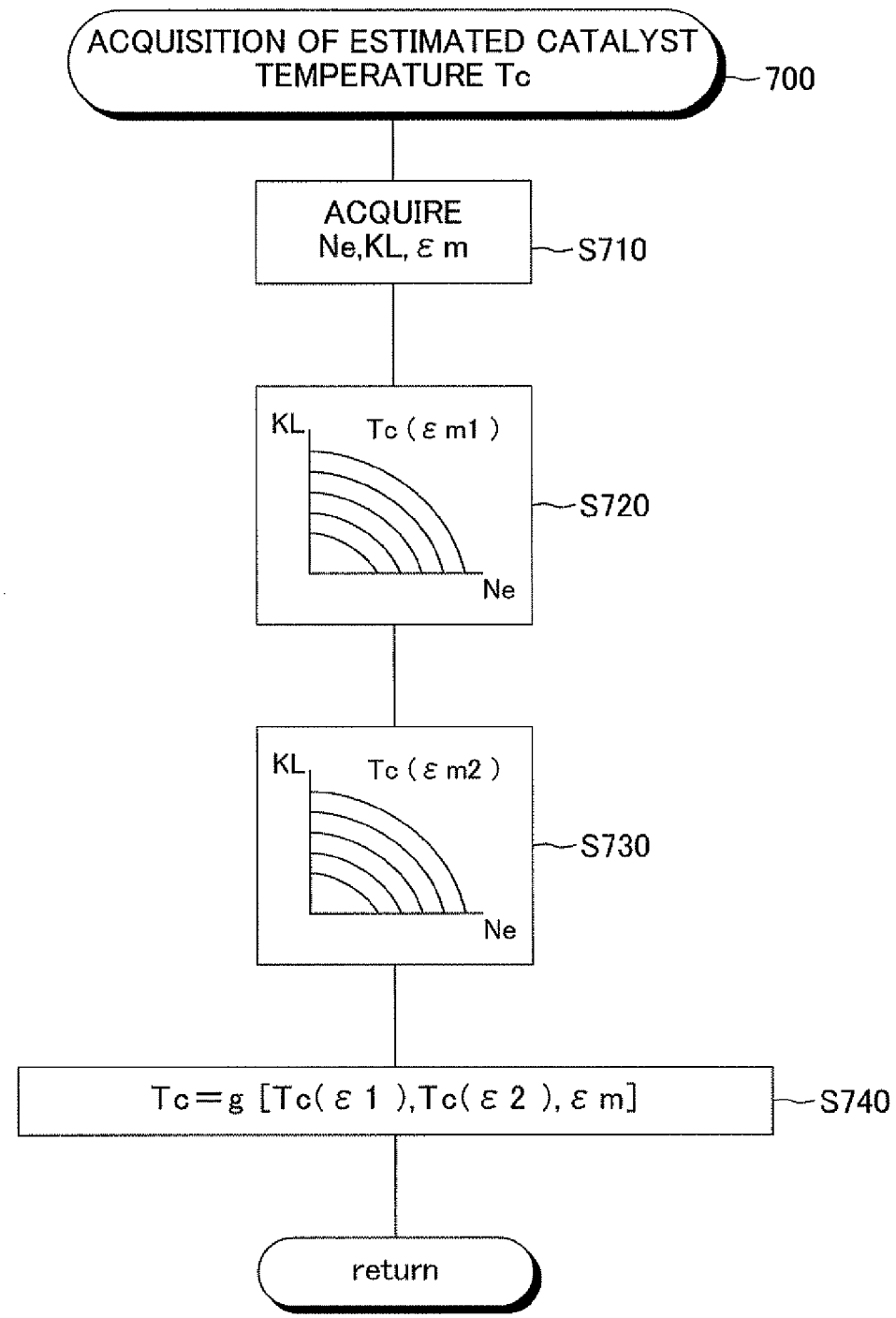
FIG. 7 is a flowchart showing an operation of an estimated catalyst temperature acquisition in the first concrete example of the operation of the control device of the embodiment shown in FIG. 1.

Next, a concrete example of the acquisition of the estimated temperature Tc of the catalytic converter 161 will be explained. The CPU 201 performs an estimated catalyst temperature acquisition routine 700 shown in FIG. 7 every a predetermined timing comes.

First, at S710, the engine speed Ne, the load ratio KL and the mechanical compression ratio ∈m are acquired. The mechanical compression ratio ∈m can be easily and relatively correctly acquired by the CPU 201 recognizing the condition of the operation control (for example, the rotation angle of the motor) of the drive mechanism 142 performed by the control device 2.

Next, at S720, a temperature Tc(∈m1) is acquired on the basis of a catalyst temperature map prepared using the engine speed Ne and the load ratio KL as parameters in the condition that the mechanical compression ratio ∈m is a predetermined value ∈m1 (for example, a minimum value ∈m_min) and the engine speed Ne and the load ratio KL acquired at S710. Similarly, at S730, a temperature Tc(∈m2) is acquired on the basis of a catalyst temperature map prepared in the condition that the mechanical compression ratio ∈m is a predetermined value ∈m2 (>∈m1: for example, a maximum value ∈m_max) and the engine speed Ne and the load ratio KL acquired at S710.

Next, at S740, an estimated catalyst temperature Tc is acquired on the basis of Tc(∈m1), Tc(∈m2), the mechanical compression ratio ∈m acquired at S710 and a predetermined map or function. For example, assuming that the change of the catalyst temperature occurred by the change of the mechanical compression ratio ∈m in the case that the engine speed Ne and the load ratio KL are constant is approximated by a straight line, the estimated catalyst temperature Tc can be acquired as follows.

$$Tc = Tc(\epsilon m1) + (\epsilon m - \epsilon m1) \cdot (Tc(\epsilon m2) - Tc(\epsilon m1))/(\epsilon m2 - \epsilon m1)$$

Thereafter, this routine is terminated once.

It should be noted that in this concrete example, a compression ratio acquisition part (compression ratio acquisition means) and an expansion ratio acquisition part (expansion ratio acquisition means) of the present invention are realized by the process of S710 in the control device 2 (the CPU 201). Further, a temperature estimation part (temperature estimation means) of the present invention is realized by the processes of S720-S740 in the control device 2.

<<Action and Effect of First Concrete Example>>

In this concrete example, the temperature of the catalytic converter 161 is estimated on-board on the basis of the actual compression ratio when the catalyst OBD is performed. In other words, the estimated temperature value of the catalytic converter 161 is corrected depending on the actual compression ratio when the catalyst OBD is performed. Accordingly, the estimation of the temperature of the catalytic converter 161 can be accurately performed. Therefore, the catalyst OBD can be accurately performed.

In this concrete example, the mechanical compression ratio is maintained constant by forbidding the change of the mechanical compression ratio depending on the operating condition during the catalyst OBD. Accordingly, the change of the temperature of the catalyst converter 161 is restricted as possible during the catalyst OBD. Therefore, the catalyst OBD can be further accurately performed.

In this concrete example, the mechanical compression ratio is controlled to a constant value which is a low compression ratio in order to increase the temperature of the catalytic converter 161 in the case that the estimated catalyst temperature Tc is lower than a predetermined deterioration determination lower limit temperature (TL). Further, the mechanical compression ratio is controlled to a constant value which is a high compression ratio in order to decrease the temperature of the catalytic converter 161 in the case that the estimated catalyst temperature Tc is higher than a predetermined deterioration determination upper limit temperature (TH). Accordingly, upon the catalyst OBD, the temperature of the catalytic converter 161 can be forced to be set within a range suitable for the deterioration determination. Therefore, the catalyst OBD can be appropriately performed.

SECOND CONCRETE EXAMPLE

Similar to the above-explained first concrete example, in a second concrete example explained below, it is assumed that the mechanical compression ratio ∈m and the expansion ratio ∈e are controlled such that the mechanical compression ratio ∈m and the expansion ratio ∈e are generally equal to each other.

<<Determination of Sensor OBD Condition>>

Figure 8:
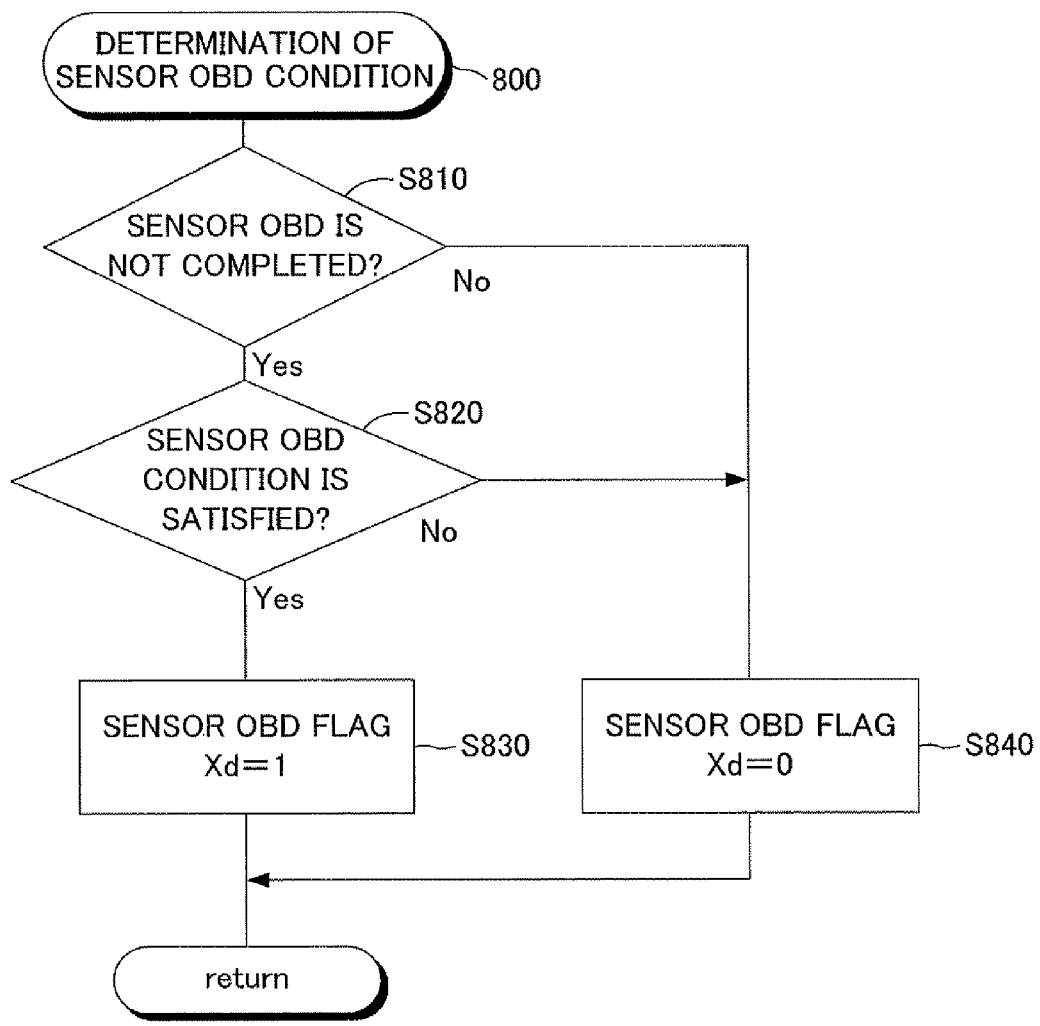
FIG. 8 is a flowchart showing an operation of a sensor OBD condition determination in a second concrete example of the operation of the control device of the embodiment shown in FIG. 1.

The CPU 201 performs a sensor OBD condition determination routine 800 shown in FIG. 8 every a predetermined timing comes. When this routine is initiated, first, at S810, it is determined if a sensor OBD has not been completed at this trip. When the sensor OBD has not been completed (S810=Yes), the process proceeds to S820, and it is determined if a sensor OBD condition is satisfied.

The sensor OBD condition includes a condition that the accelerator operation amount Accp is smaller than or equal to a predetermined amount and the change of the mechanical compression ratio ∈m is not necessary, and a predetermined temperature condition. The temperature condition is that (1) it is estimated that the upstream air-fuel ratio sensor 178a is warmed to a predetermined activation temperature in the case of the OBD of the upstream air-fuel ratio sensor 178a or that (2) the downstream air-fuel ratio sensor 178b is warmed to a predetermined activation temperature and the catalytic converter 161 is warmed to a predetermined activation temperature to be a condition to be able to exert a predetermined oxygen adsorption function in the case of the OBD of the downstream air-fuel ratio sensor 178b. Their temperatures can be estimated by the CPU 201 using engine parameters such as the cooling water temperature T2, etc.

When the sensor OBD condition is satisfied (S820=Yes), the process proceeds to S830, and a sensor OBD flag Xd is set and this routine is terminated once. On the other hand, when the sensor OBD condition is not still satisfied (S820=No), the process proceeds to S840, and the sensor OBD flag Xd is not set and this routine is terminated once. It should be noted that after the sensor OBD is completed (S810=No), the process proceeds to S840, and the sensor OBD flag Xd is reset, and this routine is terminated once.

<<Setting of Mechanical Compression Ratio>>

Figure 9:
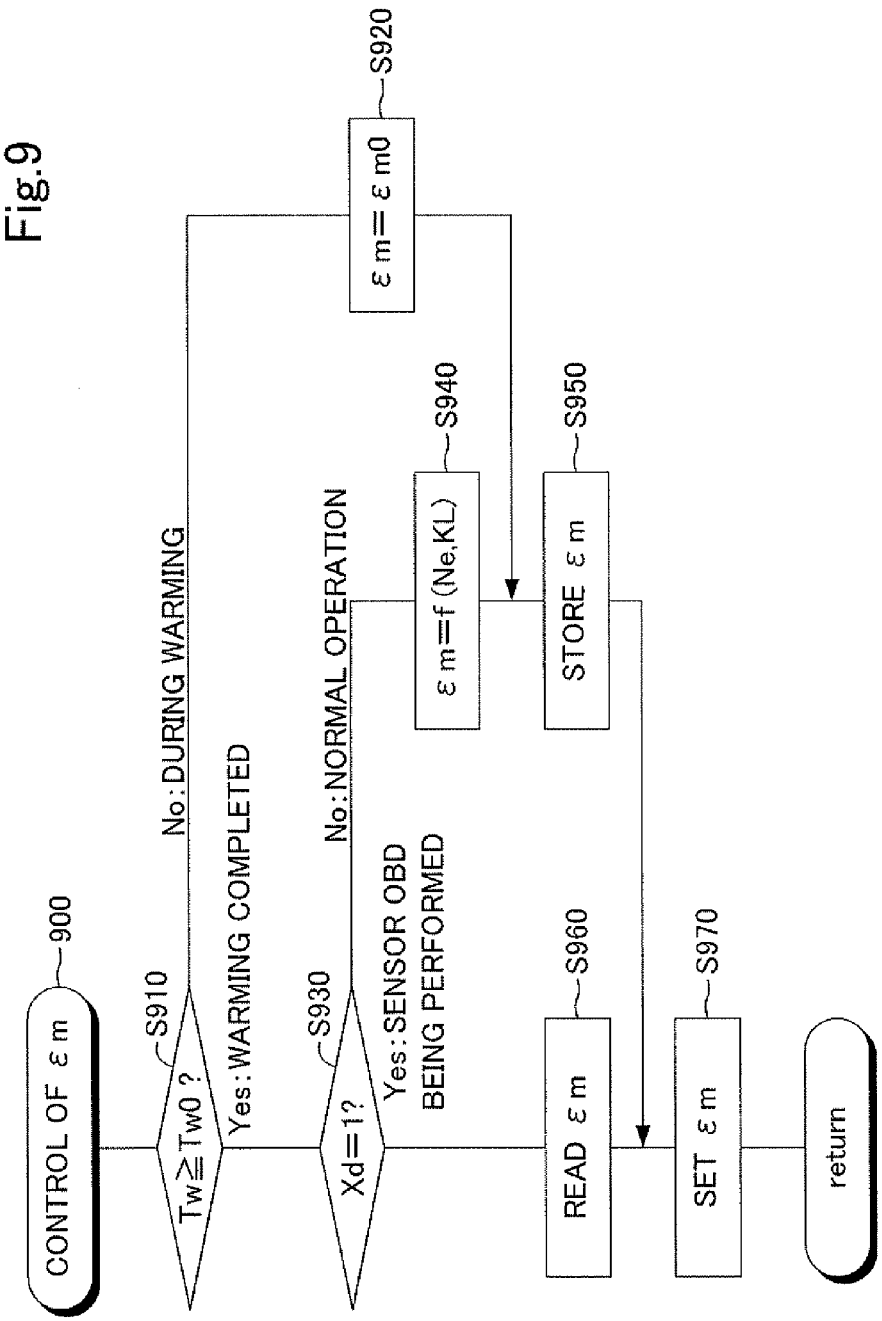
FIG. 9 is a flowchart showing a sensor OBD operation in the second concrete example.

The CPU 201 performs a mechanical compression ratio control routine 900 shown in FIG. 9 every a predetermined timing comes. It should be noted that in this concrete example, a compression ratio control part (compression ratio control means) and an expansion ratio control part (expansion ratio control means) of the present invention are realized by the process of this routine 900 in the control device 2 (the CPU 201).

When this routine is initiated, first, at S910, it is determined if the engine 1 has been warmed (if the cooling water temperature Tw≥TW0).

When the engine 1 is being warmed (S910=No), the process proceeds to S920. At S920, a target value of the mechanical compression ratio ∈m is determined to a small value ∈m0 in order to facilitate the warming of the engine 1, the catalytic converter 161, the upstream air-fuel ratio sensor 178a and the downstream air-fuel ratio sensor 178b by increasing the exhaust gas temperature.

When the engine 1 has been warmed (S910=Yes), the process proceeds to S930, and it is determined if the sensor OBD flag Xd is set. When the sensor OBD flag Xd is not set (S930=No), the present operating condition is a normal operation after the engine 1 is warmed. Accordingly, in this case, the process proceeds to S940. At S940, a target value of the mechanical compression ratio ∈m is determined by using a map, etc. on the basis of the engine speed Ne and the load ratio KL. It should be noted that the load ratio KL can be acquired on the basis of engine parameters such as the intake air flow rate Ga, the throttle valve opening degree TA, the accelerator operation amount Accp, etc. as is well known.

After the target value of the mechanical compression ratio ∈m is determined depending on the operating condition as explained above, the process proceeds to S950, and the target value is stored in the backup RAM 204.

On the other hand, when the sensor OBD flag Xd is set (S930=Yes), the target value of the mechanical compression ratio ∈m stored upon the last initiation of this routine, is read. That is, the target value of the mechanical compression ratio ∈m upon the initiation of this routine at this time is set to the same ratio as that upon the last initiation of this routine. Thereby, the mechanical compression ratio ∈m is controlled constant (the change of the mechanical compression ratio ∈m is forbidden) during the sensor OBD.

After the target value of the mechanical compression ratio $\epsilon m$ is determined as explained above, the process proceeds to S970. At S970, the drive mechanism 142 provided in the variable compression ratio mechanism 14 is controlled such that the setting state of the mechanical compression ratio $\epsilon m$ corresponds to the above-mentioned target value, and thereafter this routine is terminated once. In this regard, as explained above, since the target value of the mechanical compression ratio $\epsilon m$ is the same as that upon the last initiation of this routine during the sensor OBD, the setting state of the mechanical compression ratio $\epsilon m$ during the sensor OBD is maintained constant.

THIRD CONCRETE EXAMPLE

In a third concrete example explained below, it is assumed that the control of the mechanical compression ratio $\epsilon m$ and the expansion ratio $\epsilon e$ is performed to be able to change the expansion ratio $\epsilon e$ by controlling the opening timing of the exhaust valve 124 even when the mechanical compression ratio $\epsilon m$ is constant.

<<Control of Compression Ratio and Expansion Ratio>>

Figure 10:
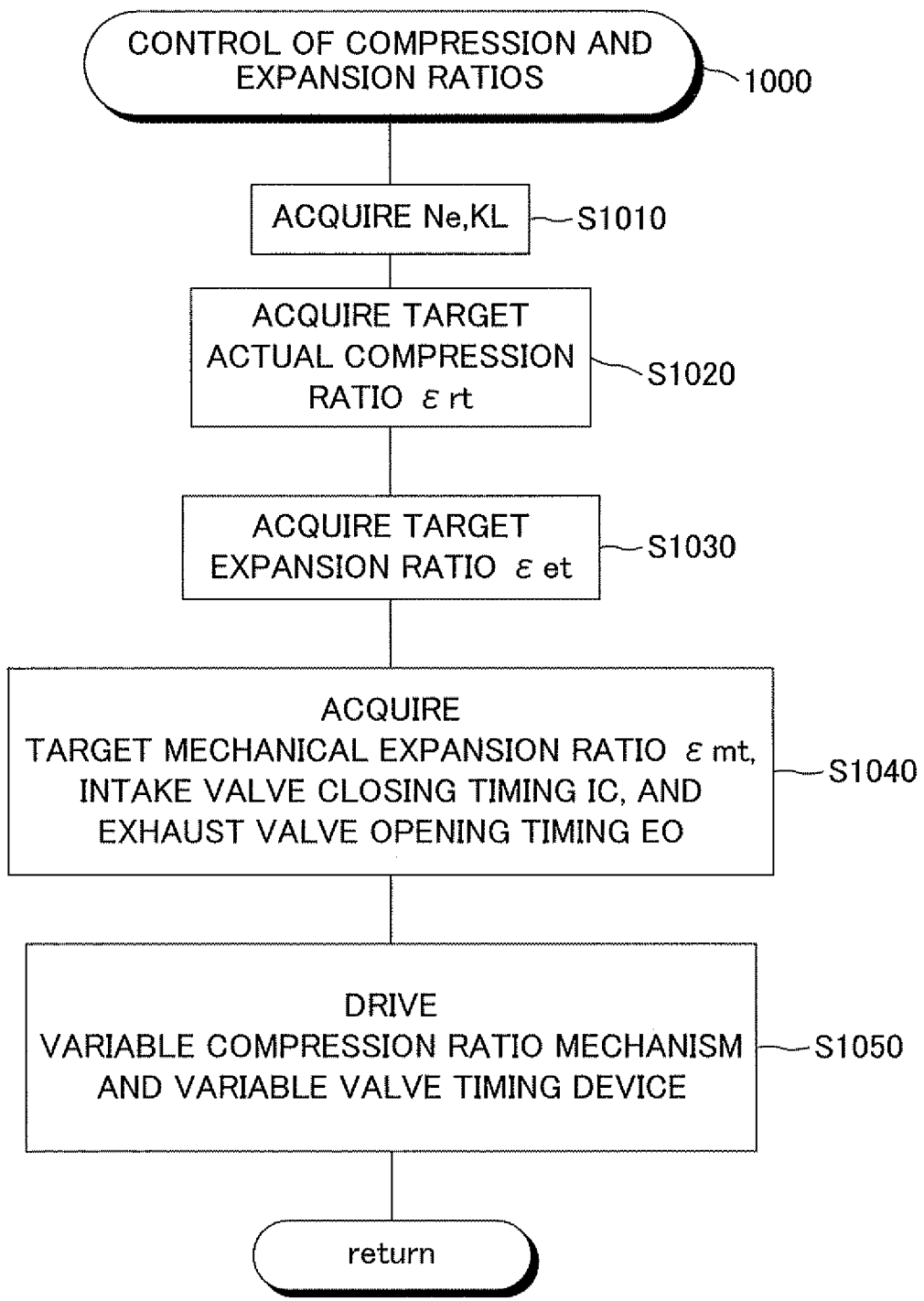
FIG. 10 is a flowchart showing a control operation of compression and expansion ratios in a third concrete example of the operation of the control device of the embodiment shown in FIG. 1.

The CPU 201 performs a compression ratio and expansion ratio control routine 1000 shown in FIG. 10 every a predetermined timing comes. It should be noted that in this concrete example, a compression ratio control part (compression ratio control means) and an expansion ratio control part (expansion ratio control means) of the present invention are realized by the process of this routine 1000 in the control device 2 (CPU 201).

When this routine is initiated, first, at S1010, operating conditions such as the engine speed Ne, the load ratio KL, etc. are acquired. Next, at S1020, a target value of the actual compression ratio $\epsilon r$ (a target actual compression ratio $\epsilon rt$) is acquired on the basis of the operating conditions and a map, etc. Following this, at S1030, a target value of the expansion ratio $\epsilon e$ (a target expansion ratio $\epsilon et$) is acquired on the basis of the operating conditions and a map, etc.

Thereafter, at S1040, a target value of the mechanical compression ratio $\epsilon m$ (a target mechanical compression ratio $\epsilon mt$), an intake valve closing timing IC and an exhaust valve opening timing EO are acquired for accomplishing the target expansion ratio $\epsilon et$ and the target actual compression ratio $\epsilon rt$, and on the basis thereof, the drives of the variable compression ratio mechanism 14, the variable intake valve timing device 124 and the variable exhaust valve timing device 126 are controlled (S1050), and this routine is terminated once.

<<Catalyst OBD>>

Figure 11:
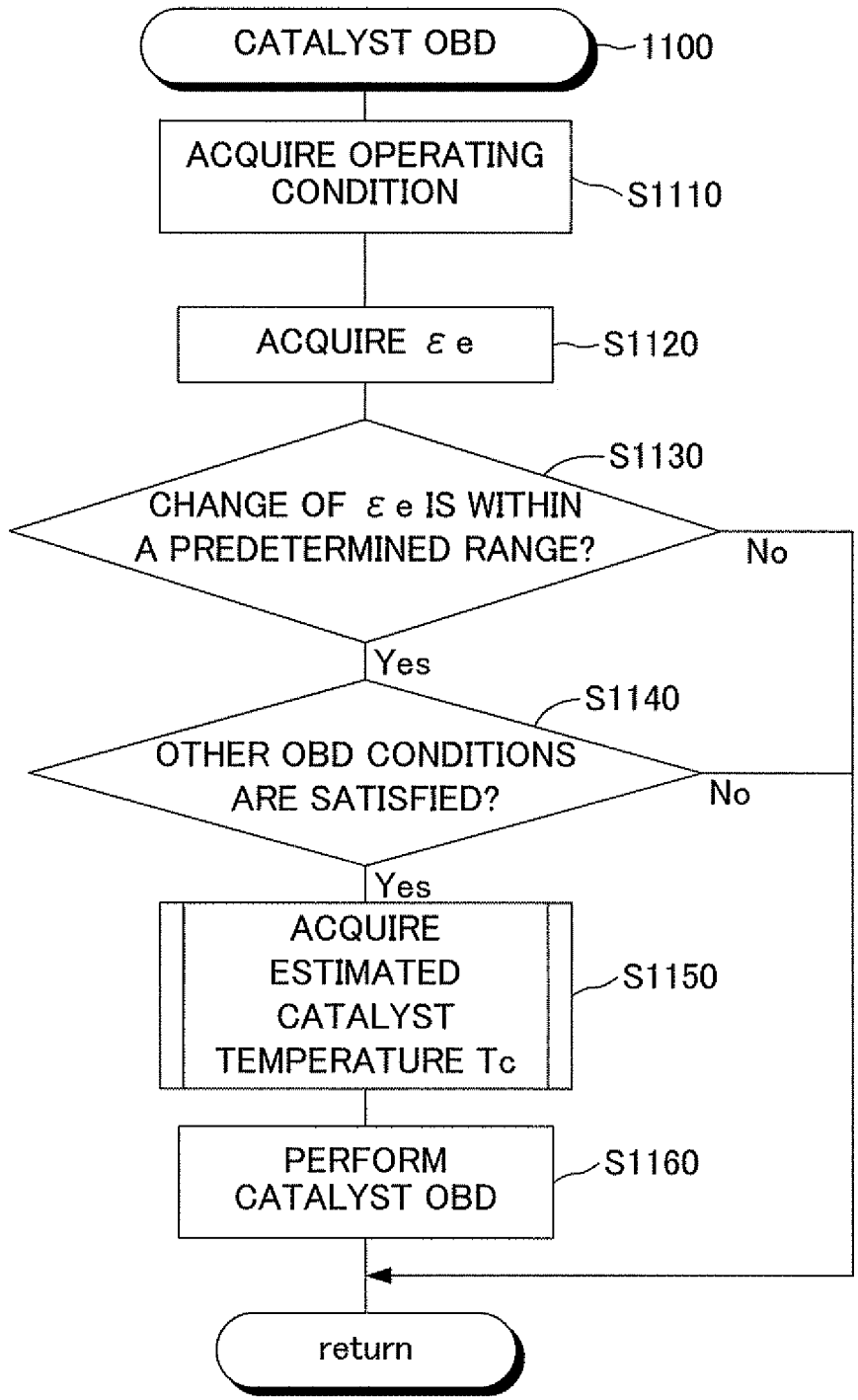
FIG. 11 is a flowchart showing a catalyst OBD operation in the third concrete example.

The CPU 201 performs a catalyst OBD routine 1100 shown in FIG. 11 every a predetermined timing comes.

When this routine is initiated, first, at S1110, operating conditions such as the engine speed Ne, the load ratio KL, etc. are acquired. Next, at S1120, an expansion ratio $\epsilon e$ is acquired. In this regard, in this example, it is assumed that the expansion ratio $\epsilon e$ is acquired on the basis of the setting state of the mechanical compression ratio $\epsilon m$ based on the output signal of the encoder provided in the servomotor of the drive mechanism 142 of the variable compression ratio mechanism 14 and the exhaust valve opening timing EO.

Next, at S1130, it is determined if the change of the expansion ratio $\epsilon e$ is within a predetermined range. In this regard, the amount of the change of the expansion ratio $\epsilon e$ can be acquired by temporally statistically processing the value of the expansion ratio $\epsilon e$ acquired at S1120. Of course, the determination of S1130 can be simply performed by determining if the deviation between the last value and the present value is within a predetermined range.

When the change of the expansion ratio $\epsilon e$ is not within the predetermined range (S1130=No), the following processes are skipped, and this routine is terminated once. When the change of the expansion ratio $\epsilon e$ is within the predetermined range (S1130=Yes), the process proceeds to S1140, and it is determined if the other OBD conditions are satisfied.

When the OBD conditions including the condition relating to the change of the expansion ratio $\epsilon e$ are satisfied (S1140=Yes), the process proceeds to S1150, and the estimated catalyst temperature Tc is acquired on the basis of the expansion ratio $\epsilon e$. The acquisition of the estimated catalyst temperature Tc is performed according to a method similar to the estimated catalyst temperature acquisition routine 700 (see FIG. 7) explained in connection with the above-explained first concrete example (except that the expansion ratio $\epsilon e$ is used in place of the mechanical compression ratio $\epsilon m$ in the above-explained routine 700, a process generally similar to the routine 700 is performed). That is, the estimated catalyst temperature Tc is corrected depending on the expansion ratio $\epsilon e$.

Thereafter, a catalyst OBD is performed (S1160) and this routine is terminated once.

As explained above, in this concrete example, the catalyst OBD can be accurately performed by employing the range of the change of the expansion ratio $\epsilon e$ as the condition for determining if the catalyst OBD should be performed. Further, the accuracy of the estimation of the estimated catalyst temperature Tc is improved by acquiring (correcting) the estimated catalyst temperature Tc depending on the expansion ratio $\epsilon e$.

It should be noted that a determination part (determination means) and a deterioration determination part (deterioration determination means) of the present invention are realized by the process of this routine 1100 in the control device 2 (the CPU 201) in this concrete example. Further, in this concrete example, a determination permission part (determination permission means) of the present invention is realized by the process of S1130 performed by the control device 2 (the CPU 201).

FOURTH CONCRETE EXAMPLE

In a fourth concrete example explained below, similar to the above-explained third concrete example, the mechanical compression ratio $\epsilon m$ and the expansion ratio $\epsilon e$ are controlled by controlling the opening timing of the exhaust valve 124 such that the expansion ratio $\epsilon e$ can be changed even when the mechanical compression ratio $\epsilon m$ is constant.

<<Catalyst OBD>>

Figure 12:
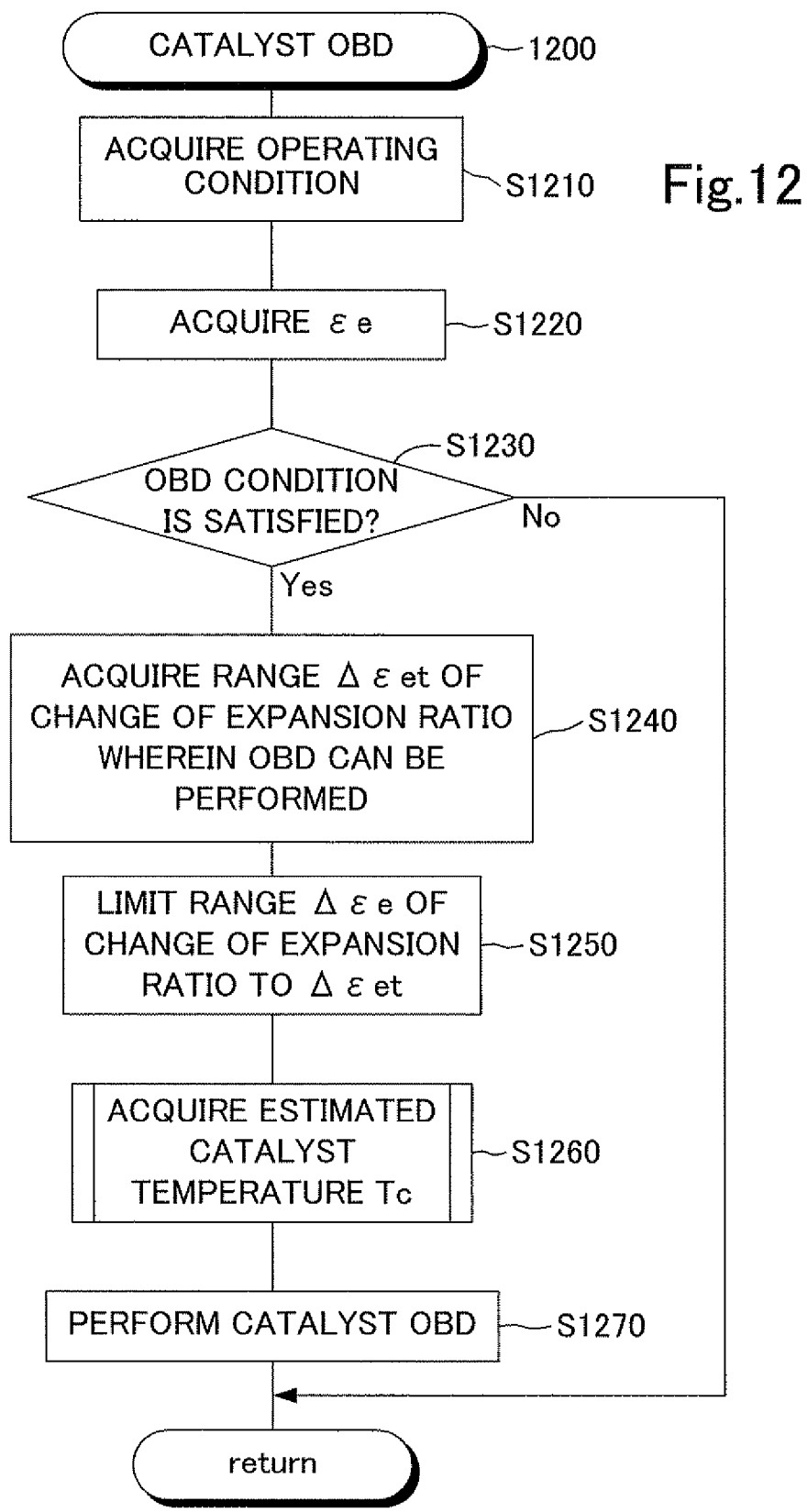
FIG. 12 is a flowchart showing a catalyst OBD operation in a fourth concrete example of the operation of the control device of the embodiment shown in FIG. 1.

The CPU 201 performs a catalyst OBD routine 1200 shown in FIG. 12 every a predetermined timing comes.

When this routine is initiated, first, at S1210, operating conditions such as the engine speed Ne, the load ratio KL, etc. are acquired. Next, at S1220, an expansion ratio $\epsilon e$ is acquired. Following this, at S1230, it is determined if OBD conditions other than the condition relating to the expansion ratio $\epsilon e$ are satisfied. When the OBD conditions are not satisfied (S1230=No), the following processes are skipped and this routine is terminated once. When the OBD conditions other than the condition relating to the expansion ratio $\epsilon e$ are satisfied (S1230=Yes), the process proceeds to S1240 and steps following it.

The range $\Delta \epsilon e$ of the change of the expansion ratio $\epsilon e$, for making the range $\Delta Tex$ of the change of the exhaust gas temperature a predetermined small constant value which is allowed upon the performance of the OBD, varies depending on the expansion ratio $\epsilon e$ upon the performance of the OBD (can be expressed as a function of the expansion ratio $\epsilon e$). Accordingly, at S1240, a target value $\Delta \epsilon et$ of the range of the change of the expansion ratio $\epsilon e$ for being able to perform the OBD is acquired on the basis of a map, etc. using the expansion ratio $\epsilon e$ as a parameter.

Next, the process proceeds to S1250, and the expansion ratio $\epsilon e$ is controlled such that the range $\Delta \epsilon e$ of the change of the actual expansion ratio $\epsilon e$ is limited to the target value $\Delta \epsilon et$. Thereafter, the process proceeds to S1260, and an estimated catalyst temperature Tc is acquired on the basis of the expansion ratio $\epsilon e$. Next, a catalyst OBD is performed (S1270) and this routine is terminated once.

As explained above, in this concrete example, the catalyst OBD can be accurately performed by limiting the range of the change of the expansion ratio $\epsilon e$ upon the performance of the catalyst OBD. Further, the accuracy of the estimation of the estimated catalyst temperature Tc is improved by acquiring (correcting) the estimated catalyst temperature Tc depending on the expansion ratio $\epsilon e$.

It should be noted that a determination part (determination means) and a deterioration determination part (deterioration determination means) of the present invention are realized by the process of this routine 1200 in the control device 2 (the CPU 201) in this concrete example.

FIFTH CONCRETE EXAMPLE

In a fifth concrete example explained below, similar to the above-explained third and fourth concrete examples, it is assumed that the mechanical compression ratio $\epsilon m$ and the expansion ratio $\epsilon e$ are controlled such that the expansion ratio $\epsilon e$ can be changed by controlling the opening timing of the exhaust valve 124 even when the mechanical compression ratio $\epsilon m$ is constant.

<<Catalyst OBD>>

Figure 13:
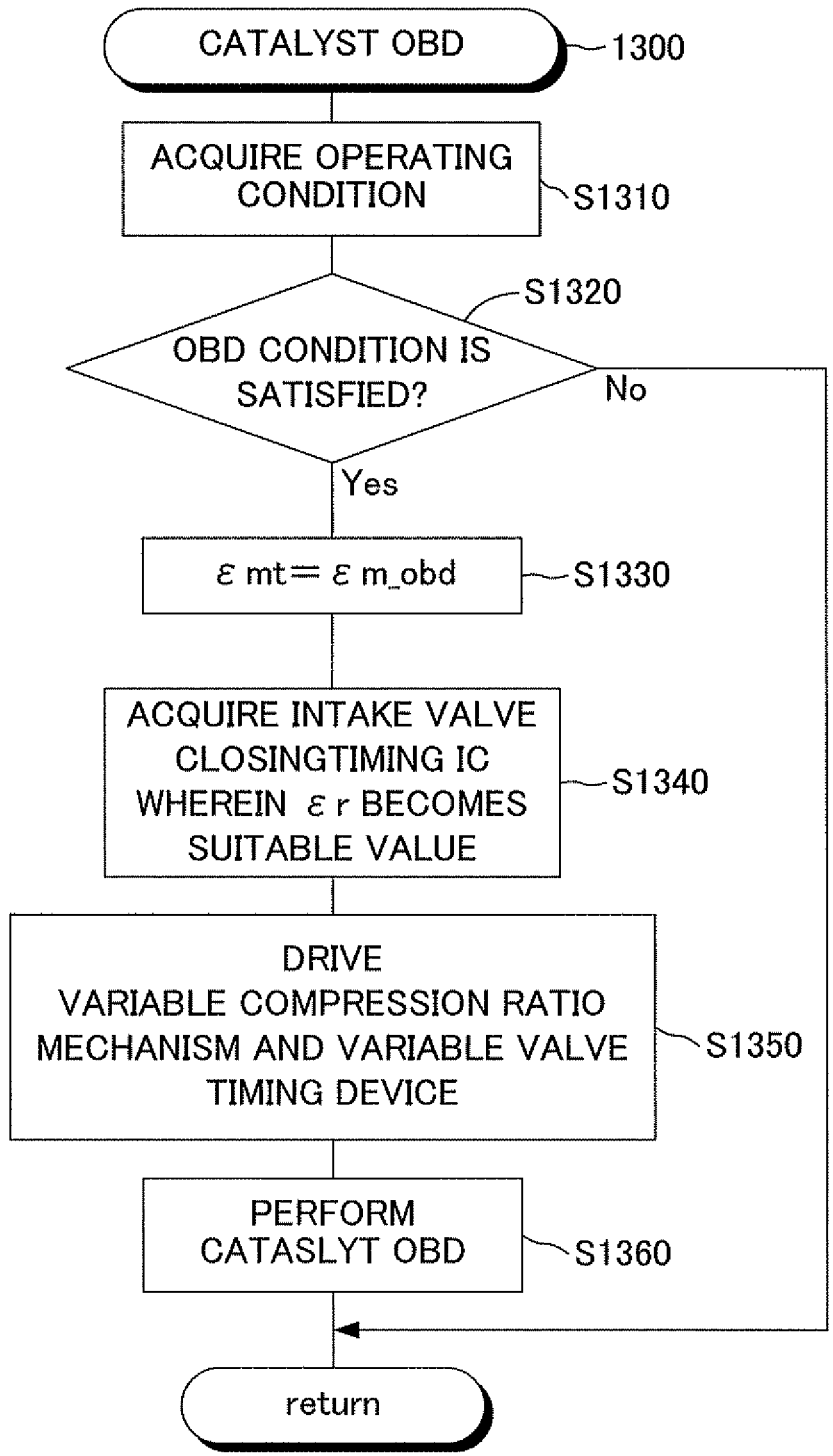
FIG. 13 is a flowchart showing a catalyst OBD operation in a fifth concrete example of the operation of the control device of the embodiment shown in FIG. 1.

The CPU 201 performs a catalyst OBD routine 1300 shown in FIG. 13 every a predetermined timing comes.

When this routine is initiated, first, at S1310, operating conditions such as the engine speed Ne, the load ratio KL, etc. are acquired. Next, at S1320, it is determined if OBD conditions other than the condition relating to the expansion ratio $\epsilon e$ are satisfied. When the OBD conditions are not satisfied (S1320=No), the following processes are skipped and this routine is terminated once. When the OBD conditions other than the condition relating to the expansion ratio $\epsilon e$ are satisfied (S1320=Yes), the process proceeds to S1330 and the steps following it.

At S1330, a target mechanical compression ratio $\epsilon mt$ is set to a predetermined value $\epsilon mt\_obd$ upon the OBD. The predetermined value $\epsilon mt\_obd$ is set to a value (e.g. a low compression ratio of around 10) such that the range $\Delta Tex$ of the change of the exhaust gas temperature becomes small compared with the change of the mechanical compression ratio $\epsilon m$ (i.e. the change of the expansion ratio $\epsilon e$). Next, the process proceeds to S1340 and an intake valve closing timing IC such that the actual compression ratio $\epsilon r$ becomes a suitable value, is acquired on the basis of a map, etc.

Next, the process proceeds to S1350 and the drives of the variable compression ratio mechanism 14, the variable intake valve timing device 125 and the variable exhaust valve timing device 126 are controlled on the basis of the result of the above-explained processes. At this time, the throttle valve opening degree TA may be suitably adjusted such that the required intake air amount is accomplished. Thereafter, a catalyst OBD is performed (S1360) and this routine is terminated once.

As explained above, in this concrete example, the mechanical compression ratio $\epsilon m$ is set such that the catalyst OBD can be accurately performed by limiting the range of the change of the expansion ratio $\epsilon e$ upon the performance of the catalyst OBD to a small range. Thereby, the accuracy of the estimation of the estimated catalyst temperature Tc can be improved, while the calculation load of the OBD can be decreased by omitting the acquisition (the correction) of the estimated catalyst temperature Tc depending on the expansion ratio $\epsilon e$.

It should be noted that a determination part (determination means) and a deterioration determination part (deterioration determination means) of the present invention are realized by the process of this routine 1300 in the control device 2 (the CPU 201) in this concrete example. Further, a compression ratio control part (compression ratio control means) and an expansion ratio control part (expansion ratio control means) of the present invention are realized by the process of S1330.

Exemplification of Modifications

It should be noted that the above-explained embodiments are just examples of concrete configurations of the present invention which the applicant considered best at the filing of this application as explained above, and therefore the invention should not be limited to the embodiments. Accordingly, it is a matter of course that various modifications can be applied to the concrete configurations indicated in the above-explained embodiments without changing the essential parts of the present invention.

Below, several modified examples will be indicated. In this regard, in the explanations of the following modified examples, the same names and reference symbols as those of the above-explained embodiments are used regarding the components of the modified examples having a configuration or functions similar to those of the above-explained embodiments. Further, regarding the explanations of the components, the explanations of the above-explained embodiments can be suitably invoked as far as they are inconsistent.

Of course, it is obvious that the modified examples are not limited to the followings. It should not be permitted to narrowly construe the present invention on the basis of the descriptions of the above-explained embodiments and the following modified examples, since the benefit of the applicant (in particular, who files an application early under the first file system) is unduly prejudiced, while imitators unduly obtain benefits.

Further, it is obvious that the configuration of the above-explained embodiments and the configuration described in connection with the modified examples explained below can be suitably combined as far as it is technically inconsistent.

(1) The present invention can be applied to a gasoline engine, a diesel engine, a methanol engine, a bioethanol engine, and any other type of engines. There is no specific limitation regarding the number of cylinders, the type of the array of the cylinders (inline type, V type, horizontal opposed type) and the type of the fuel injection (port injection type, direct injection type).

(2) The configuration of the engine 1 including the variable compression ratio mechanism 14 is not limited to those of the above-explained embodiments. For example, the present invention can be suitably applied to a case that the engine 1 is configured such that the connection rod 132 has a multi-link structure and the mechanical compression ratio is changed by changing a folded state of the connection rod 132 (see the Unexamined Japanese Patent Publication No. 2004-156541, etc.).

(3) The control of the compression ratio of the above-explained first and second concrete examples is mainly to control the mechanical compression. However, the present invention is not limited thereto. For example, the present invention may be similarly applied to a control of the actual compression ratio by the variable intake and/or exhaust valve timing device(s) 125 or 126. Further, the change of the actual compression ratio depending on the operating condition can be performed by using both of the change of the mechanical compression ratio performed by the variable compression ratio mechanism 14 and the change of the valve timing performed by the variable intake and/or exhaust valve timing device(s) 125 or 126. The present invention can be suitably applied to these cases.

That is, the compression ratio control of the above-explained first and second concrete examples can be called as an expansion ratio control.

(4) The present invention is not limited to the concrete processes described in connection with the above-explained concrete examples. For example, the modifications explained below are possible.

The compression ratio and/or expansion ratio acquisition part(s) of the present invention is/are not limited to the means disclosed in the above-explained embodiments.

Specifically, in the above-explained embodiments, the setting state of the mechanical compression ratio $\epsilon m$ is acquired on the basis of the output of the encoder provided in the servomotor of the drive mechanism 142 of the variable compression ratio mechanism 14. Of course, in place of this, for example, the setting state of the mechanical compression ratio $\epsilon m$ can be acquired on the basis of an output of a linear sensor such as a stroke sensor, etc. for generating an output depending on a relative position between the cylinder block 11 and the cylinder head 12.

Further, the actual compression ratio $\epsilon r$ and the expansion ratio $\epsilon e$ can be acquired on the basis of the setting state of the mechanical compression ratio $\epsilon m$ and the outputs of the intake and exhaust cam position sensors 173 and 174.

In the above-explained embodiments, the catalyst OBD is performed once per trip (period from the start of the operation of the engine to the stop thereof). However, the present invention is not limited to this.

Further, in the above-explained embodiments, the value of the estimated catalyst temperature is used in the compression ratio control and the catalyst deterioration determination. However, the present invention is not limited to this. For example, the estimation of the warmed state of the catalyst can be performed by estimating the catalyst temperature. That is, the estimation of the warmed state of the catalyst may be included in the catalyst OBD. Besides, the present invention is not limited to the concrete examples explained in connection with the flowcharts in the above-explained embodiments. For example, the estimation of the catalyst temperature can be performed by various methods other than an interpolation or extrapolation using a map of a temperature corresponding to two compression ratios as in the above-explained embodiments. For example, temperature maps corresponding to several standard compression ratios are prepared and the estimation of the catalyst temperature may be performed by selecting the temperature map corresponding to the standard compression ratio which is closest to the actual compression ratio upon the performance of the catalyst OBD.

For example, the sensor OBD can be performed by a method other than the confirmation of the responsiveness upon the air-fuel ratio active control.

In the case that OBD is simultaneously performed regarding both of the upstream and downstream air-fuel ratio sensors 178a and 178b, as in the above-explained concrete examples, it is sufficient that a single sensor OBD flag Xd is prepared. Compared with this, in the case that after the OBD is performed and completed regarding one of the sensors in which the OBD condition is easily satisfied (for example, the upstream air-fuel ratio sensor 178a), the OBD is performed regarding the other (for example, the downstream air-fuel ratio sensor 178b), a flag Xd1 for the upstream air-fuel ratio sensor and a flag Xd2 for the downstream air-fuel ratio sensor may be separately prepared as flags for determining the satisfaction of the sensor OBD condition in place of the above-mentioned sensor OBD flag Xd.

The compression ratio control is not limited to that of the above-explained concrete example. For example, the setting of the compression ratio to a low compression ratio $\epsilon m0$ during the warming of the engine 1 can be omitted. That is, S910 and S920 can be omitted.

The OBD condition relating to the expansion ratio $\epsilon e$ can be a condition that "the expansion ratio $\epsilon e$ is generally constant" by narrowing the predetermined range of S1130 to around the amount of the change of the expansion ratio $\epsilon e$ which occurs when the expansion ratio $\epsilon e$ is to be controlled constant.

Further, the present invention can be applied to processes other than the estimation of the catalyst temperature, the catalyst OBD and the sensor OBD. For example, the present invention can be applied to the temperature estimation and the OBD of members other than those (the catalytic converter 161, the upstream air-fuel ratio sensor 178a and the downstream air-fuel ratio sensor 178b) employed in the above-explained concrete examples among the members positioned in the exhaust passage 16. Further, the present invention can be applied to a device for estimating the exhaust gas temperature (see the Unexamined Japanese Patent Publication Nos. 2000-227364, 2006-291828, etc.).

(5) Besides, it is a matter of course that modified examples which are not particularly referred, are within the technical scope of the present invention as far as the essential parts of the present invention are not changed.

Further, the contents (including the specifications and the drawings) of the Publications referred in this specification can be incorporated to constitute a part of this specification.

Further, operationally or functionally expressed elements in the elements constituting means of the present invention for solving the problems include any structures which can accomplish the action and the function other than the concrete structures disclosed in the above-explained embodiments and the modified examples.

The invention claimed is:

1. A control device applied to a system having an engine configured such that a compression ratio can be changed and a catalyst positioned in a passage for an exhaust gas discharged from said engine, comprising:
a compression ratio acquisition part configured to acquire the compression ratio;
a temperature estimation part configured to estimate a temperature of said catalyst on the basis of the compression ratio acquired by said compression ratio acquisition part;
a compression ratio control part configured to control the compression ratio; and
a deterioration determination part configured to determine a deterioration state of said catalyst on the basis of the catalyst temperature of said catalyst estimated by said temperature estimation part;
wherein said compression ratio control part is configured to control the compression ratio to a constant ratio during a determination of the deterioration state of said catalyst performed by said deterioration determination part.

2. The control device as set forth in claim 1, wherein said temperature estimation part is configured to estimate the temperature of said catalyst on the basis of, at least, a parameter relating to an amount of an intake air in said engine and the compression ratio acquired by said compression ratio acquisition part.

3. The control device as set forth in claim 2, wherein said compression ratio control part is configured to control the compression ratio to a low constant compression ratio during the determination of the deterioration state of said catalyst performed by said deterioration determination part when the estimated catalyst temperature is lower than a predetermined lower limit temperature for the deterioration determination.

4. The control device as set forth in claim 3, wherein said compression ratio control part is configured to control the compression ratio to a high constant compression ratio during the determination of the deterioration state of said catalyst performed by said deterioration determination part when the estimated catalyst temperature is higher than a predetermined upper limit temperature for the deterioration determination.

5. The control device as set forth in claim 2, wherein said compression ratio control part is configured to control the compression ratio to a high constant compression ratio during the determination of the deterioration state of said catalyst performed by said deterioration determination part when the estimated catalyst temperature is higher than a predetermined upper limit temperature for the deterioration determination.

6. The control device as set forth in claim 1, wherein said compression ratio control part is configured to control the compression ratio to a low constant compression ratio during the determination of the deterioration state of said catalyst performed by said deterioration determination part when the estimated catalyst temperature is lower than a predetermined lower limit temperature for the deterioration determination.

7. The control device as set forth in claim 6, wherein said compression ratio control part is configured to control the compression ratio to a high constant compression ratio during the determination of the deterioration state of said catalyst performed by said deterioration determination part when the estimated catalyst temperature is higher than a predetermined upper limit temperature for the deterioration determination.

8. The control device as set forth in claim 1, wherein said compression ratio control part is configured to control the compression ratio to a high constant compression ratio during the determination of the deterioration state of said catalyst performed by said deterioration determination part when the estimated catalyst temperature is higher than a predetermined upper limit temperature for the deterioration determination.

9. A control device applied to a system having an engine configured such that a compression ratio can be changed, comprising:
a compression ratio acquisition part configured to acquire the compression ratio;
a temperature estimation part configured to estimate a temperature of an exhaust gas discharged from said engine or a member positioned in a passage for the exhaust gas on the basis of the compression ratio acquired by said compression ratio acquisition part; and
a determination part configured to determine a deterioration state of said member, using the result of the estimation of the temperature performed by said temperature estimation part as a condition to determine the deterioration state of said member,
wherein said determination part determines the deterioration state of said member when the compression ratio is constant or the change thereof is within a predetermined range.

10. The control device as set forth in claim 9, further comprising:
a compression ratio control part configured to control the compression ratio;
wherein said compression ratio control part is configured to control the compression ratio to a constant compression ratio during the determination of the state performed by said determination part.

11. A control device applied to a system having an engine configured such that a compression ratio can be changed, comprising:
a compression ratio acquisition part configured to acquire the compression ratio;
a determination part configured to determine a state of a member positioned in a passage for an exhaust gas discharged from said engine; and
a determination permission part configured to permit said determination part to perform the determination on the basis of the compression ratio acquired by said compression ratio acquisition part;
wherein said determination permission part permits said determination part to perform the determination when the compression ratio is constant or the change thereof is within a predetermined range.

12. The control device as set forth in claim 11, further comprising:
a compression ratio control part configured to control the compression ratio;
wherein said compression ratio control part is configured to control the compression ratio to a constant compression ratio during the determination of the state performed by said determination part.

* * * * *